US012627408B2

(12) United States Patent
Zorgui et al.

(10) Patent No.: US 12,627,408 B2
(45) Date of Patent: May 12, 2026

(54) SIDELINK RETRANSMISSION OF MESSAGES

(71) Applicant: QUALCOMM Incorporated, San Diego, CA (US)

(72) Inventors: Marwen Zorgui, San Diego, CA (US); Ahmed Elshafie, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 18/296,826

(22) Filed: Apr. 6, 2023

(65) Prior Publication Data

US 2024/0340108 A1     Oct. 10, 2024

(51) Int. Cl.
| | |
|---|---|
| *H04L 1/16* | (2023.01) |
| *H04L 1/1607* | (2023.01) |
| *H04W 72/02* | (2009.01) |
| *H04W 72/25* | (2023.01) |
| *H04W 72/40* | (2023.01) |
| *H04W 92/18* | (2009.01) |

(52) U.S. Cl.
CPC .......... *H04L 1/1671* (2013.01); *H04W 72/02* (2013.01); *H04W 72/25* (2023.01); *H04W 72/40* (2023.01); *H04W 92/18* (2013.01)

(58) Field of Classification Search
None
See application file for complete search history.

(56) References Cited

U.S. PATENT DOCUMENTS

| | | | |
|---|---|---|---|
| 2019/0044667 A1 | 2/2019 | Guo et al. | |
| 2022/0046663 A1* | 2/2022 | Yang ...................... | H04W 28/26 |
| 2022/0264533 A1* | 8/2022 | Zhang ................... | H04L 1/1812 |
| 2022/0400475 A1* | 12/2022 | Suh ........................ | H04W 72/23 |
| 2023/0099975 A1* | 3/2023 | Hahn ..................... | H04W 80/08 |
| | | | 370/329 |
| 2024/0014943 A1* | 1/2024 | Kuo ....................... | H04L 1/1822 |
| 2024/0422752 A1* | 12/2024 | Miao ..................... | H04L 1/1854 |

OTHER PUBLICATIONS

International Search Report and Written Opinion—PCT/US2024/018849—ISA/EPO—Jul. 1, 2024.
Mursia P., et al., "D2D-Aided Multi-Antenna Multicasting", ICC 2019—2019 IEEE International Conference on Communications (ICC), IEEE, May 20, 2019, XP033581933, Abstract p. 1, col. 1, Line 21—p. 2, col. 4, Line 34, 6 Pages.

* cited by examiner

*Primary Examiner* — Abdullahi Ahmed
*Assistant Examiner* — Ahmed Saifuddin
(74) *Attorney, Agent, or Firm* — Harrity & Harrity, LLP

(57) ABSTRACT

Various aspects of the present disclosure generally relate to wireless communication. In some aspects, a second user equipment (UE) may receive, from a network node, at least one message, the at least one message comprising at least one of a first common message directed to a first UE or a first private message directed to the first UE. The second UE may decode the at least one message. The second UE may receive, from the network node, a retransmission indication instructing the second UE to transmit, to the first UE, at least one retransmission of the at least one message. The second UE may transmit, to the first UE, the retransmission of the at least one message. Numerous other aspects are described.

30 Claims, 11 Drawing Sheets

800 ⟶

810 ⟶ Receive, from a network node, at least one message, the at least one message comprising at least one of a first common message directed to a first UE or a first private message directed to the first UE 820 ⟶ Decode the at least one message 830 ⟶ Receive, from the network node, a retransmission indication instructing the first UE to transmit, to the first UE, a retransmission of the at least one message 840 ⟶ Transmit, to the first UE, the retransmission of the at least message

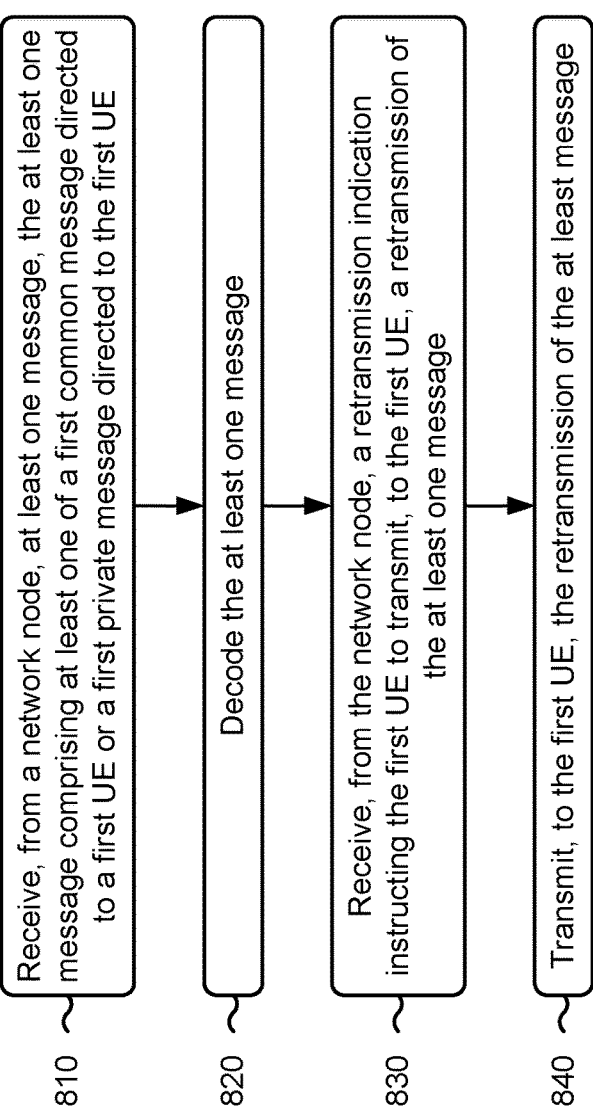

810   Receive, from a network node, at least one message, the at least one message comprising at least one of a first common message directed to a first UE or a first private message directed to the first UE 820   Decode the at least one message 830   Receive, from the network node, a retransmission indication instructing the first UE to transmit, to the first UE, a retransmission of the at least one message 840   Transmit, to the first UE, the retransmission of the at least message

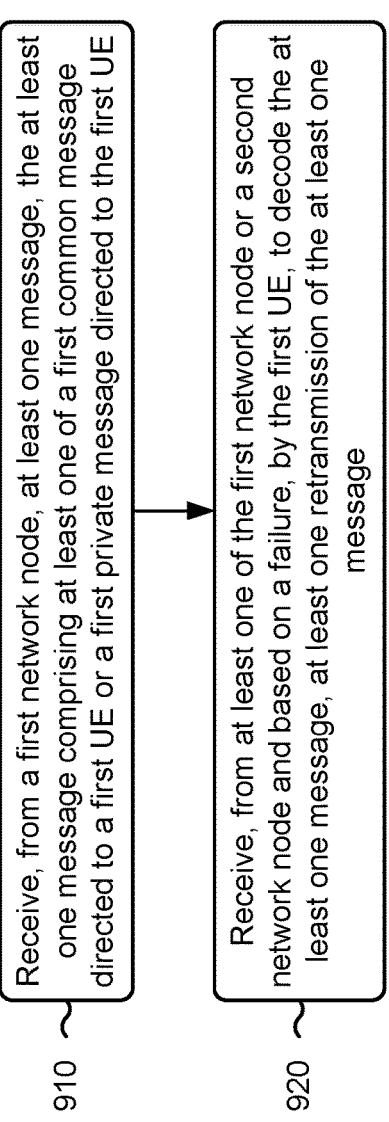

900

910  Receive, from a first network node, at least one message, the at least one message comprising at least one of a first common message directed to a first UE or a first private message directed to the first UE 920  Receive, from at least one of the first network node or a second network node and based on a failure, by the first UE, to decode the at least one message, at least one retransmission of the at least one message

FIG. 9

SIDELINK RETRANSMISSION OF MESSAGES

FIELD OF THE DISCLOSURE

Aspects of the present disclosure generally relate to wireless communication and to techniques and apparatuses for sidelink retransmission of messages.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a second user equipment (UE) for wireless communication. The second UE may include a memory and one or more processors coupled to the memory. The one or more processors may be configured to receive, from a network node, at least one message, the at least one message comprising at least one of a first common message directed to a first UE or a first private message directed to the first UE. The one or more processors may be configured to decode the at least one message. The one or more processors may be configured to receive, from the network node, a retransmission indication instructing the second UE to transmit, to the first UE, at least one retransmission of the at least one message. The one or more processors may be configured to transmit, to the first UE, the retransmission of the at least one message.

Some aspects described herein relate to a first UE for wireless communication. The first UE may include a memory and one or more processors coupled to the memory. The one or more processors may be configured to receive, from a first network node, at least one message, the at least one message comprising at least one of a first common message directed to a first UE or a first private message directed to the first UE. The one or more processors may be configured to receive, from at least one of the first network node or a second network node and based on a failure, by the first UE, to decode the at least one message, at least one retransmission of the at least one message.

Some aspects described herein relate to a method of wireless communication performed by a second UE. The method may include receiving, from a network node, at least one message, the at least one message comprising at least one of a first common message directed to a first UE or a first private message directed to the first UE. The method may include decoding the at least one message. The method may include receiving, from the network node, a retransmission indication instructing the second UE to transmit, to the first UE, at least one retransmission of the at least one message. The method may include transmitting, to the first UE, the retransmission of the at least one message.

Some aspects described herein relate to a method of wireless communication performed by a first UE. The method may include receiving, from a first network node, at least one message, the at least one message comprising at least one of a first common message directed to a first UE or a first private message directed to the first UE. The method may include receiving, from at least one of the first network node or a second network node and based on a failure, by the first UE, to decode the at least one message, at least one retransmission of the at least one message.

Some aspects described herein relate to a non-transitory computer-readable medium that stores a set of instructions for wireless communication by a second UE. The set of instructions, when executed by one or more processors of the UE, may cause the UE to receive, from a network node, at least one message, the at least one message comprising at least one of a first common message directed to a first UE or a first private message directed to the first UE. The set of instructions, when executed by one or more processors of the UE, may cause the UE to decode the at least one message. The set of instructions, when executed by one or more processors of the UE, may cause the UE to receive, from the network node, a retransmission indication instructing the second UE to transmit, to the first UE, at least one retransmission of the at least one message. The set of instructions, when executed by one or more processors of the UE, may cause the UE to transmit, to the first UE, the retransmission of the at least one message.

Some aspects described herein relate to a non-transitory computer-readable medium that stores a set of instructions for wireless communication by a first UE. The set of instructions, when executed by one or more processors of the UE, may cause the UE to receive, from a first network node, at least one message, the at least one message comprising at least one of a first common message directed to the first UE or a first private message directed to the first UE. The set of instructions, when executed by one or more processors of the UE, may cause the UE to receive, from at least one of the first network node or a second network node and based on a failure, by the first UE, to decode the at least one message, at least one retransmission of the at least one message.

Some aspects described herein relate to an apparatus for wireless communication. The apparatus may include means for receiving, from a network node, at least one message, the at least one message comprising at least one of a first common message directed to a first UE or a first private message directed to the first UE. The apparatus may include means for decoding the at least one message. The apparatus may include means for receiving, from the network node, a retransmission indication instructing the second UE to transmit, to the first UE, at least one retransmission of the at least one message. The apparatus may include means for transmitting, to the first UE, the retransmission of the at least one message.

Some aspects described herein relate to an apparatus for wireless communication. The apparatus may include means for receiving, from a first network node, at least one message, the at least one message comprising at least one of a first common message directed to the apparatus or a first private message directed to the apparatus. The apparatus may include means for receiving, from at least one of the first network node or a second network node and based on a failure, by the apparatus, to decode the at least one message, at least one retransmission of the at least one message.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a second UE, in accordance with the present disclosure.

FIG. 9 is a diagram illustrating an example process performed, for example, by a first UE, in accordance with the present disclosure.

DETAILED DESCRIPTION

Figure 1:
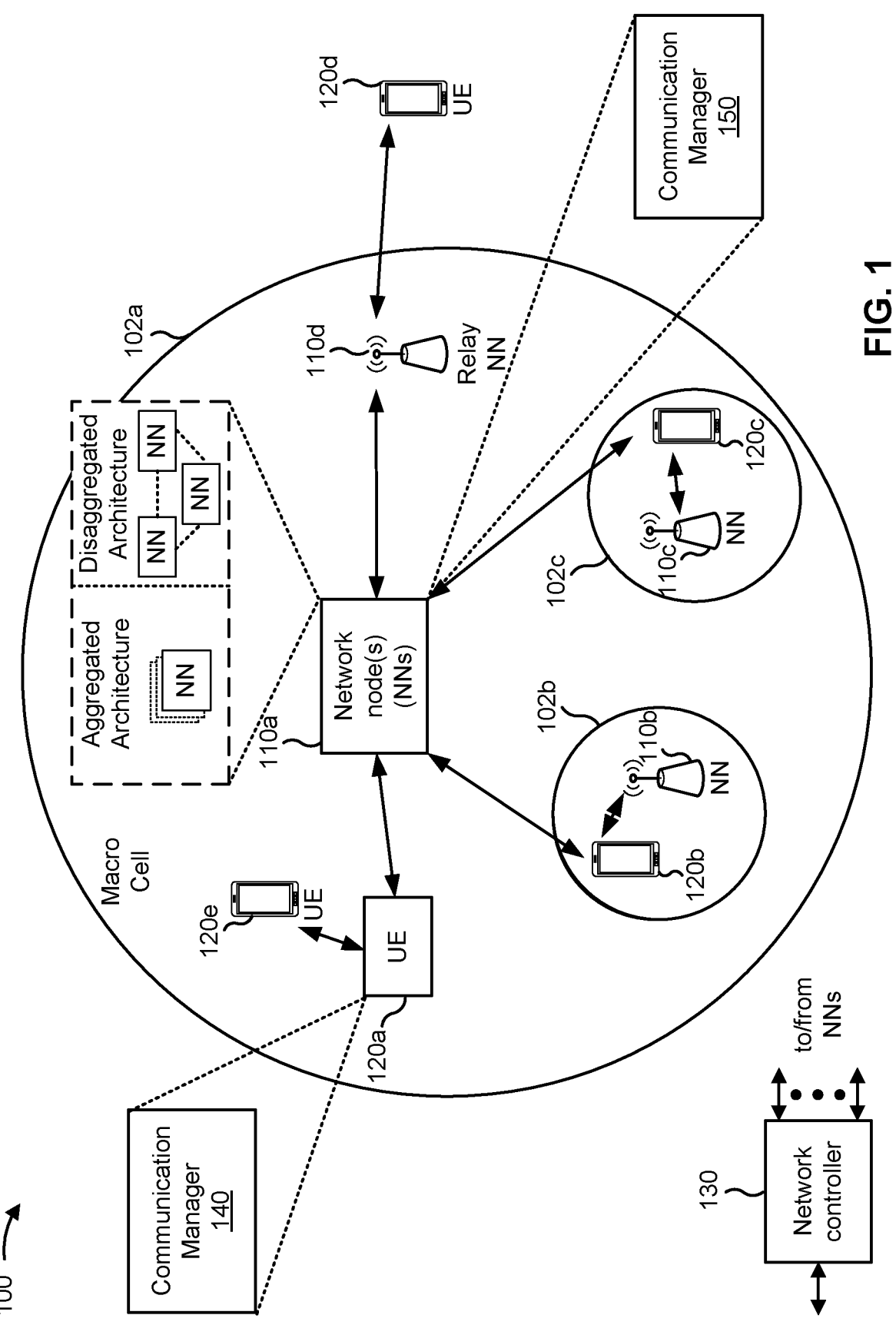
FIG. 1 is a diagram illustrating an example of a wireless network, in accordance with the present disclosure.

"Rate splitting" multiple input multiple output (MIMO) may refer to a communication scheme that splits user messages into common and private parts (referred to herein as "common messages" and "private messages," respectively), and that encodes the common parts into one or several communication streams while encoding the private parts into separate streams. Receivers may then decode the common stream, perform successive interference cancellation (SIC) based at least in part on decoding the common stream, and/or decode their respective private streams. Each receiver (e.g., a user equipment (UE) 120, described below) may then reconstruct the original message intended for the receiver from the parts of the message embedded in the common stream and the private stream. In some cases, rate splitting MIMO may result in decoding part of interference at a receiver (e.g., the part of the interference included in the common stream) and treating part of the interference as noise (e.g., the part of the interference included in private streams not intended for the receiver), resulting in improved network performance (e.g., reduced latency, increased throughput, and/or reduced power, computing, and/or communication resource consumption) as compared to other communication schemes (e.g., schemes that fully treat multi-user interference as noise, leading to increased communication errors, and/or schemes that fully decode multi-user interference, resulting in high power, computing, and communication resource consumption).

In some cases, a UE that is configured for receiving common messages and private messages for MIMO rate splitting can fail to receive (e.g., fail to obtain and/or decode), from a network node, a common message and/or a private message, in which case the UE will be unable to reconstruct the message corresponding to the common message and the private message. In some cases, the network node can retransmit the common message and/or the private message, but doing so consumes access link time and frequency resources, as well as energy resources at the network node.

Some aspects of the techniques and apparatuses described herein may include retransmission, via a sidelink, of a common message and/or a private message. In some aspects, for example, a second UE may receive, from a network node, at least one message. The at least one message may include at least one of a first common message directed to a first UE or a first private message directed to the first UE. The second UE may decode the at least one message and may receive, from the network node, a retransmission indication instructing the second UE to transmit, to the first UE, at least one retransmission of the at least one message. The second UE may transmit, to the first UE, the retransmission of the at least one message. In some aspects, the network node may transmit the at least one message and/or retransmit the at least one message. In some aspects, the network node and/or the second UE may provide an indication, to the first UE, of which entity (e.g., the network node and/or the second UE) will retransmit the at least one message. In this way, the receiving UE (e.g., the UE for which the common message and/or private message is intended) may have a greater chance of receiving the common part and the private part of the message, thereby increasing the reliability of communication without increasing the access link overhead and/or energy consumption at the network node.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a second UE (e.g., the UE 120) may include a communication manager 140. As described in more detail elsewhere herein, the communication manager 140 may receive, from a network node, at least one message, the at least one message comprising at least one of a first common message directed to a first UE or a first private message directed to the first UE; decode the at least one message; receive, from the network node, a retransmission indication instructing the second UE to transmit, to the first UE, at least one retransmission of the at least one message; and transmit, to the first UE, the retransmission of the at least one message.

In some aspects, a communication manager 140 may receive, from a first network node, at least one message, the at least one message comprising at least one of a first common message directed to a first UE or a first private message directed to the first UE; and receive, from at least one of the first network node or a second network node and based on a failure, by the first UE, to decode the at least one message, at least one retransmission of the at least one message. Additionally, or alternatively, the communication manager 140 may perform one or more other operations described herein.

As indicated above, FIG. 1 is provided as an example. Other examples may differ from what is described with regard to FIG. 1.

Figure 2:
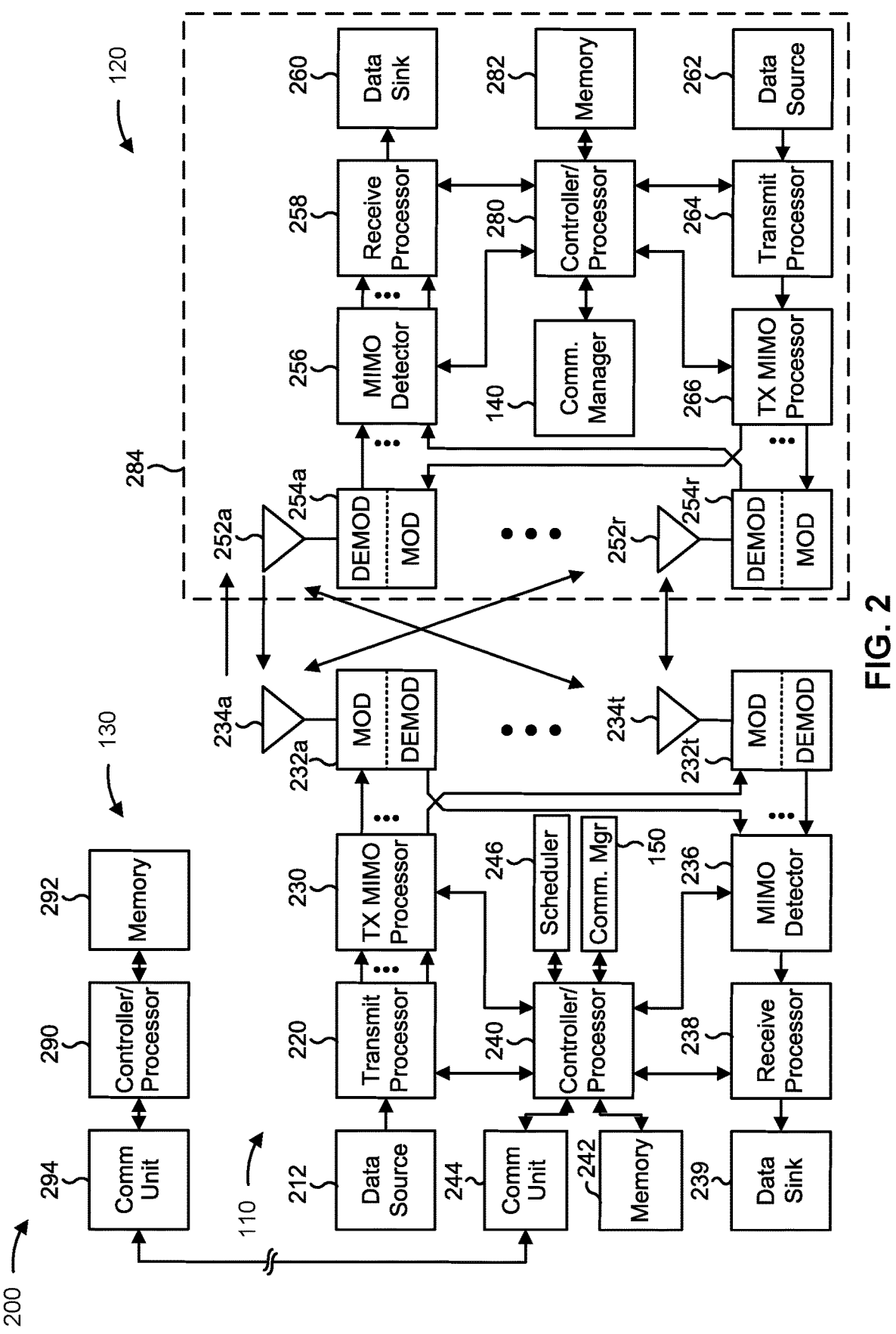
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a network node, such as for millimeter wave communications and/or the like. In such a case, the network node may provide the UE with a configuration of transmission configuration indicator (TCI) states that respectively indicate beams that may be used by the UE, such as for receiving a physical downlink shared channel (PDSCH). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-co-location (QCL) type. A QCL type may indicate one or more spatial parameters to be derived from the source signal. The source signal may be referred to as a QCL source. The network node may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a QCL type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive proces-

15 | 16 sor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, and/or any other component(s) of FIG. 2 may perform one or more techniques associated with sidelink retransmission for rate splitting messages, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a second UE (e.g., the UE 120), of a first and second UE, includes means for receiving, from a network node, at least one message, the at least one message comprising at least one of a first common message directed to the first UE or a first private message directed to the first UE; means for decoding the at least one message; means for receiving, from the network node, a retransmission indication instructing the second UE to transmit, to the first UE, at least one retransmission of the at least one message; and/or means for transmitting, to the first UE, the retransmission of the at least one message.

In some aspects, the first UE includes means for receiving, from a first network node, at least one message, the at least one message comprising at least one of a first common message directed to the first UE or a first private message directed to the first UE; and/or means for receiving, from at least one of the first network node or a second network node and based on a failure, by the first UE, to decode the at least one message, at least one retransmission of the at least one message. The means for the first UE and/or the second UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
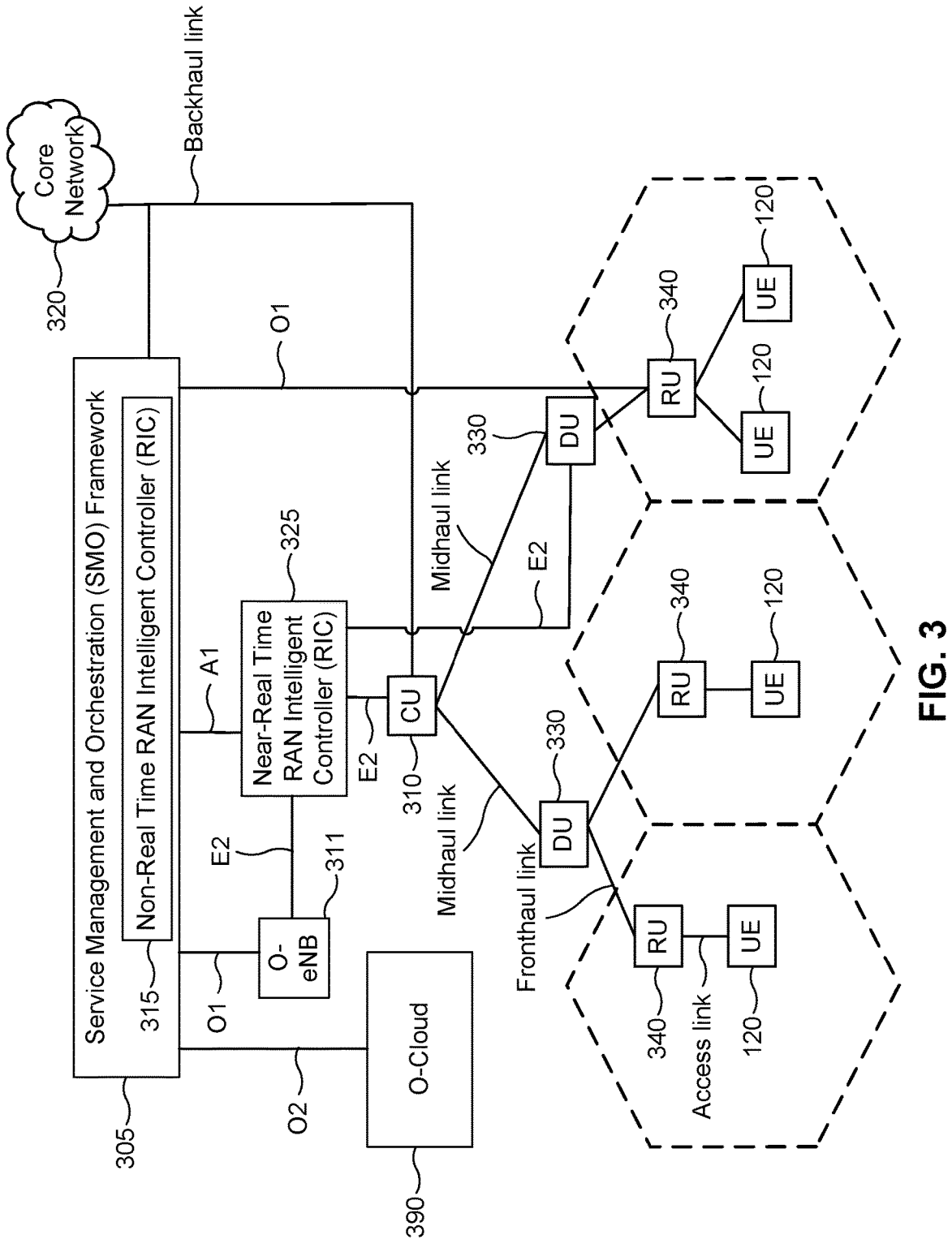
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU

330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
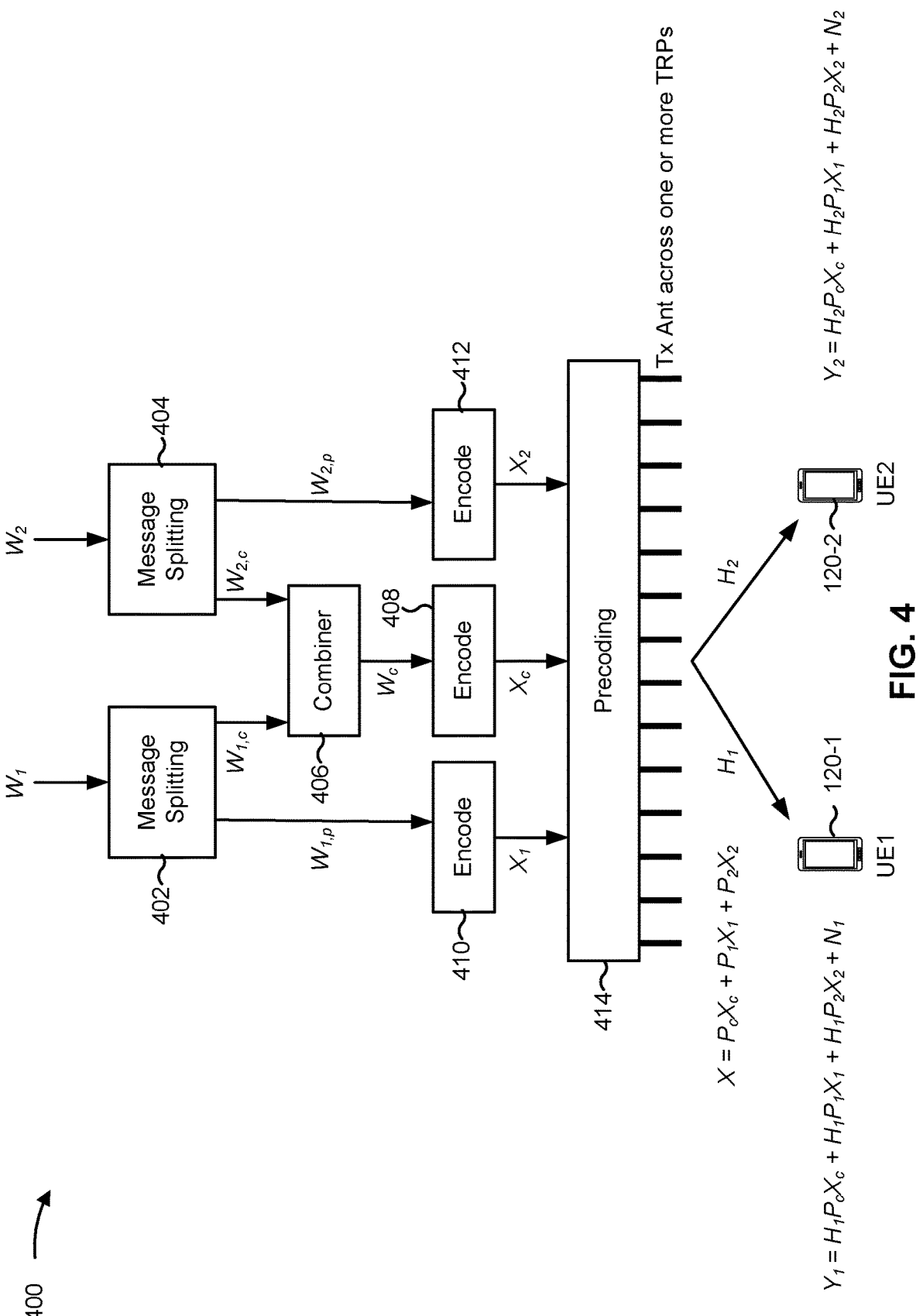
FIG. 4 is a diagram illustrating an example of a rate splitting multiple input multiple output (MIMO) communication, in accordance with the present disclosure.

FIG. 4 is a diagram illustrating an example 400 of a rate splitting MIMO communication, in accordance with the present disclosure.

"Rate splitting MIMO" may refer to a communication scheme that splits user messages into common and private parts (referred to herein as "common messages" and "private messages," respectively), and that encodes the common parts into one or several communication streams while encoding the private parts into separate streams. Receivers (e.g., UEs 120) may then decode the common stream, perform successive interference cancellation (SIC) based at least in part on decoding the common stream, and/or decode their respective private streams. Each receiver may then reconstruct its original message from the part of its message embedded in the common stream and its private stream. In some cases, rate splitting MIMO may result in decoding part of interference at a receiver (e.g., the part of the interference included in the common stream) and treating part of the interference as noise (e.g., the part of the interference included in private streams not intended for the receiver), resulting in improved network performance (e.g., reduced latency, increased throughput, and/or reduced power, computing, and/or communication resource consumption) as compared to other communication schemes (e.g., schemes that fully treat multi-user interference as noise, leading to increased communication errors, and/or schemes that fully decode multi-user interference, resulting in high power, computing, and communication resource consumption).

Example 400 illustrates a rate splitting MIMO scheme for two UEs 120, shown as UE1 120-1 and UE2 120-2 in FIG. 4. In example 400, a first message $W_1$ is intended for UE1 120-1, and a second message $W_2$ is intended for UE2 120-2. As shown by reference numbers 402 and 404, the first message $W_1$ and the second message $W_2$ may be split into common and private parts. More particularly, as shown in connection with the message splitting block indicated by reference number 402, the first message $W_1$ may be split into a common part $W_{1,c}$ (e.g., a "common message") and a private part $W_{1,p}$ (e.g., a "private message"), and, as shown in connection with the message splitting block indicated by reference number 404, the second message $W_2$ May be split into a common part $W_{2,c}$ and a private part $W_{2,p}$. As shown in connection with the combiner block indicated by reference number 406, the common parts $W_{1,c}$ and $W_{2,c}$ may be combined (e.g., concatenated) into a common message $W_c$, and, as shown in connection with the encoder block indicated by reference number 408, the common message We may be encoded and modulated to a common stream $X_c$, which may have one or more layers. Put another way, the common part of individual messages (in this case the common part $W_{1,c}$ of the first message $W_1$ and the common part $W_{2,c}$ of the first message $W_2$) of two or more Ues 120 (e.g., UE1 120-1 and UE2 120-2) may be concatenated into a common message (e.g., $W_c$), and encoded and modulated to a common stream (e.g., $X_c$) including one or more layers. As shown in connection with the encode blocks indicated by reference numbers 410 and 412, the private parts $W_{1,p}$ and $W_{2,p}$ of the individual messages $W_1$ and $W_2$ may be separately encoded and modulated into a first private stream $X_1$ and a second private stream $X_2$. In some cases, operations performed at the encode blocks indicated by reference numbers 408, 410, and 412 may include modulation and mapping to one or more layers (including codeword (CW)-layer mapping) in addition to encoding.

As shown by reference number 414, the various streams (e.g., the common stream $X_c$, the first private stream $X_1$, and the second private stream $X_2$) may be precoded and transmitted by transmission (Tx) antennas from one or more network nodes 110s and/or TRPs (e.g., from one network node 110, or else from multiple network nodes 110 and/or TRPs in a coordinated multipoint (COMP) transmission scenario or similar transmission scenario). More particularly, the common stream $X_c$ may be precoded by a precorder $P_c$, the first private stream $X_1$ may be precoded by a precorder $P_1$, and the second private stream $X_2$ may be precoded by a precorder $P_2$, such that the transmit stream X transmitted by the Tx antennas may be equal to $P_cX_c+P_1X_1+P_2X_2$. More generally, for K receivers (e.g., for K UEs 120), the transmit stream X may be expressed as $P_cX_c+\Sigma_{k\in K}P_kX_k$, with $X_k$ corresponding to the encoded message intended for each receiver k. The transmit stream X may be transmitted to each receiver (e.g., UE1 120-1 and UE2 120-2 in the depicted example) over respective channels $H_1$ and $H_2$, such as via a corresponding physical downlink shared channel (PDSCH) associated with the respective channels $H_1$ and $H_2$. Accordingly, the signal received by the UE1 120-1, denoted as $Y_1$, may be expressed as $H_1P_cX_c+H_1P_1X_1+H_1P_2X_2+N_1$, where $N_1$ corresponds to noise in the channel. Similarly, the signal received by the UE2 120-2, denoted as $Y_2$, may be expressed as $H_2P_cX_c+H_2P_1X_1+H_2P_2X_2+N_2$, where $N_2$ corresponds to noise in the channel. The individual receivers (e.g., UE1 120-1 and UE2 120-2) may then decode the common and private parts of the received signals (e.g., $Y_1$ and $Y_2$), which is described in more detail in connection with FIG. 5.

As indicated above, FIG. 4 is provided as an example. Other examples may differ from what is described with respect to FIG. 4.

Figure 5:
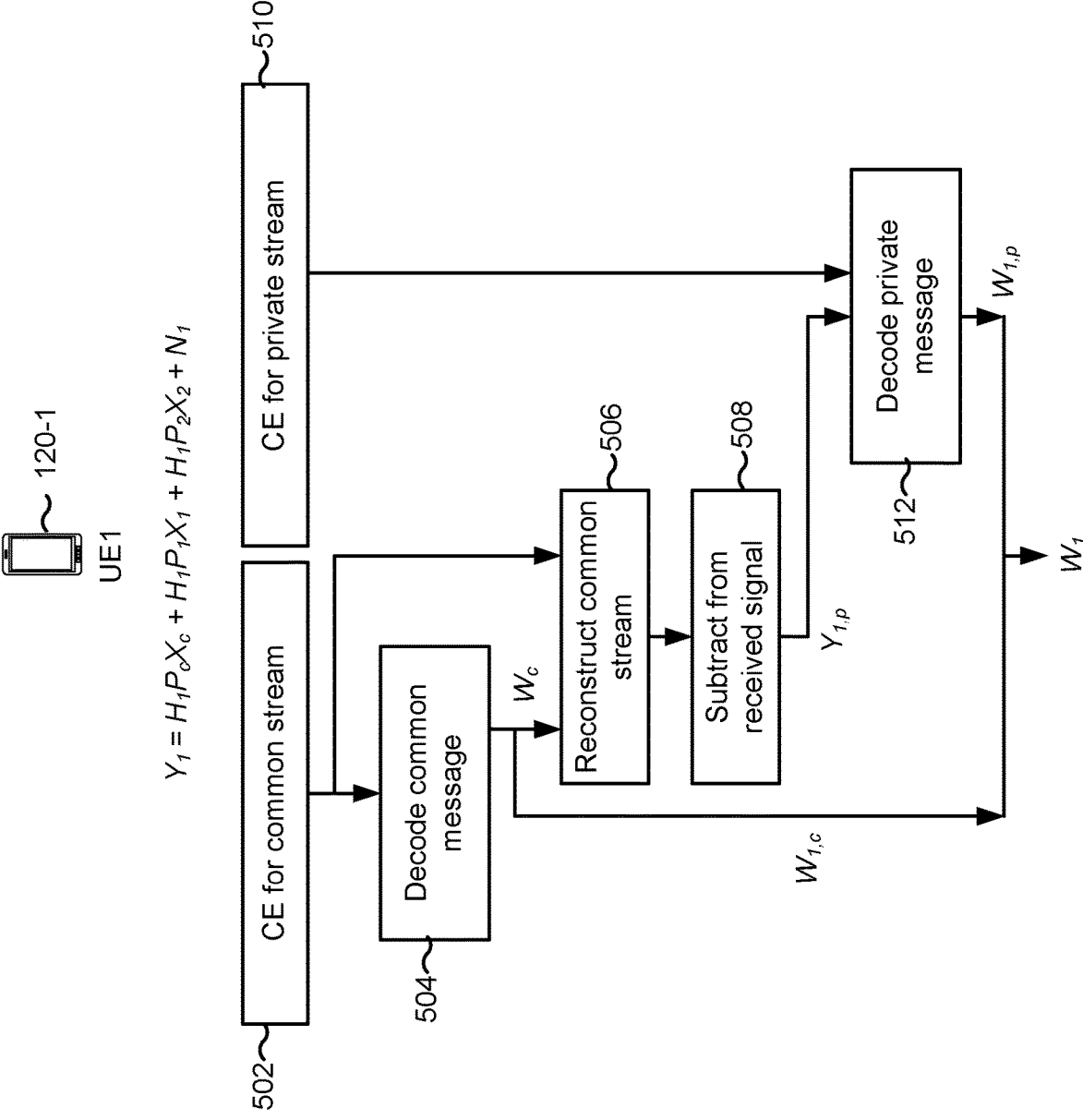
FIG. 5 is a diagram illustrating an example of a receiver decoding a rate splitting MIMO communication, in accordance with the present disclosure.

FIG. 5 is a diagram illustrating an example 500 of a receiver decoding a rate splitting MIMO communication, in accordance with the present disclosure. For simplicity, the example 500 shown in FIG. 5 illustrates steps that the UE1 120-1 may use to decode the received signal (e.g., $Y_1$) via the channel $H_1$, but other UEs (e.g., UE2 120-2) may perform a substantially similar process with respect to respective received signals (e.g., $Y_2$).

At the receiver side, each UE (e.g., UE1 120-1 and UE2 120-2 in the example depicted in FIG. 4) may first decode the common message. More particularly, as shown in connection with the channel estimation (CE) for common stream block indicated by reference number 502, the UE1 120-1 may perform channel estimation for the common stream (e.g., the UE1 120-1 may estimate $H_1P_c$), and, as shown in connection with the decode common message block indicated by reference number 504, the UE1 120-1 may decode the common message $W_c$ (e.g., the UE1 120 may perform a decoding process using the common stream $H_1P_cX_c$ based at least in part on the estimated channel, resulting in the common message $W_c$). In some cases, the operations performed at the block indicated by reference number 504 may include performing demodulation and/or demapping, in addition to decoding.

In some examples, decoding the common message $W_c$ may serve at least two purposes. First, a portion of the individual message intended for each receiver (e.g., $W_{1,c}$ and $W_{2,c}$) may be embedded in common message $W_c$. Thus, by decoding the common message $W_c$, the UE1 120-1 may retrieve data intended for the UE1 120-1. Put another way, by decoding the common message $W_c$, the UE1 120-1 may retrieve $W_{1,c}$. Second, decoding the common message $W_c$ may be used to perform SIC to increase the likelihood of successfully decoding the private message $W_{1,p}$. More particularly, after decoding the common message $W_c$, the UE1 120-1 may reconstruct the common stream $X_c$ (e.g., the UE1 120-1 may re-encode the common message $W_c$ to the common stream $X_c$), as shown in connection with the reconstruct common stream block indicated by reference number 506. Additionally, as shown in connection with the subtract from received signal block indicated by reference number 508, the UE1 120-1 may multiply the common stream $X_c$ by the estimated effective channel (e.g., $H_1P_c$) and subtract the result (e.g., $H_1P_cX_c$) from the received signal $Y_1$, resulting in a portion of the received signal $Y_{1,p}$ associated with the private part of the message intended for the UE1 120-1. In some examples, such as in examples associated with perfect channel estimation and successful decoding of the common message $W_c$, $Y_{1,p}$ may be equal to $Y_1-H_1P_cX_c$, or rather $H_1P_1X_1+H_1P_2X_2+N_1$.

The UE1 120-1 may then use the portion of the received signal $Y_{1,p}$ (e.g., $H_1P_1X_1+H_1P_2X_2+N_1$) to decode the private part $W_{1,p}$ of the message $W_1$ intended for the UE1 120-1. More particularly, as shown in connection with the CE for private stream block indicated by reference number 510, the UE1 120-1 may perform channel estimation for the private stream (e.g., the UE1 120-1 may estimate $H_1P_1$), and, as shown in connection with the decode private message block indicated by reference number 512, the UE1 120-1 may decode the private message $W_{1,p}$ (e.g., the UE1 120 may perform decoding on the portion of the received signal $Y_{1,p}$ based at least in part on the estimated channel, resulting in the private message $W_{1,p}$). In some cases, the operations performed at the block indicated by reference number 512 may include demodulation and/or demapping, in addition to decoding. The portion of the common message $W_{1,c}$ intended for the UE1 120-1 and the private message $W_{1,p}$ may thus jointly form the message $W_1$ intended for the UE1 120-1.

Although the operations described above in connection with FIG. 5 correspond to a UE performing SIC, in some other examples a receiver (e.g., UE 120) may perform different decoding schemes in order to decode the message intended for the receiver. For example, in some examples, an alternative to SIC may include a receiver performing joint demodulation of the private stream and the common stream, and then separately decoding the private codeword and the common codeword, among other decoding schemes. Moreover, although in the examples described above in connection with FIGS. 4 and 5 the common message $W_c$ included information intended for both the UE1 120-1 and the UE 120-2, in some other examples, the common message $W_c$ may include part of an individual message (e.g., $W_{k,c}$) for only a subset of co-scheduled UEs.

As indicated above, FIG. 5 is provided as an example. Other examples may differ from what is described with respect to FIG. 5.

In some cases, UEs that are configured to receive common messages and private messages for MIMO rate splitting also can be configured to communicate with one another via a sidelink.

Figure 6:
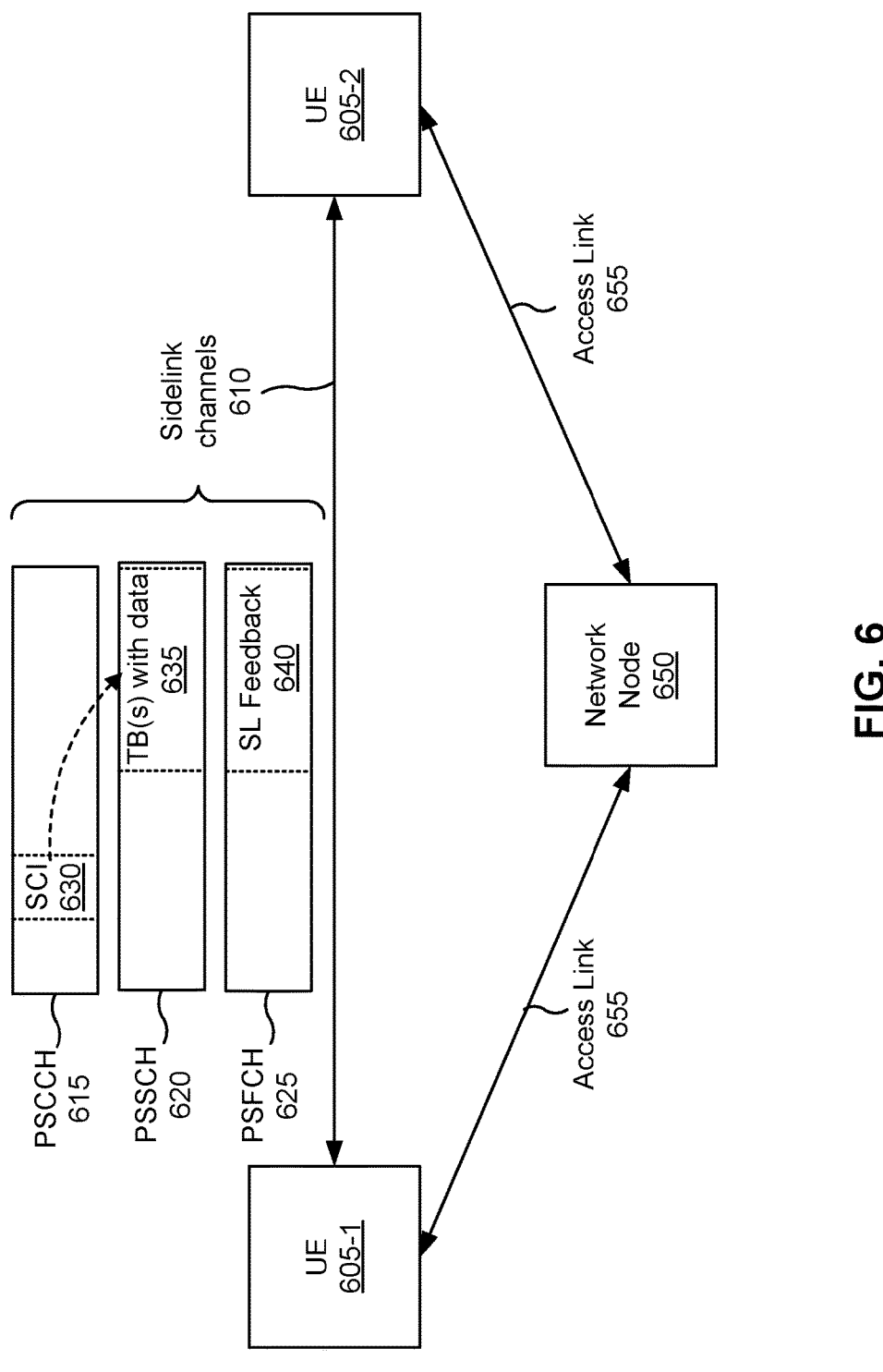
FIG. 6 is a diagram illustrating an example of sidelink communications, in accordance with the present disclosure.

FIG. 6 is a diagram illustrating an example 600 of sidelink communications, in accordance with the present disclosure.

As shown in FIG. 6, a first UE 605-1 may communicate with a second UE 605-2 (and one or more other UEs 605) via one or more sidelink channels 610. The UEs 605-1 and 605-2 may communicate using the one or more sidelink channels 610 for P2P communications, D2D communications, V2X communications (e.g., which may include V2V communications, V2I communications, and/or V2P communications) and/or mesh networking. In some aspects, the UEs 605 (e.g., UE 605-1 and/or UE 605-2) may correspond to one or more other UEs described elsewhere herein, such as UE 120. In some aspects, the one or more sidelink channels 610 may use a PC5 interface and/or may operate in a high frequency band (e.g., the 5.9 GHZ band). Additionally, or alternatively, the UEs 605 may synchronize timing of transmission time intervals (TTIs) (e.g., frames, subframes, slots, or symbols) using global navigation satellite system (GNSS) timing.

As further shown in FIG. 6, the one or more sidelink channels 610 may include a physical sidelink control channel (PSCCH) 615, a physical sidelink shared channel (PSSCH) 620, and/or a physical sidelink feedback channel (PSFCH) 625. The PSCCH 615 may be used to communicate control information, similar to a physical downlink control channel (PDCCH) and/or a physical uplink control channel (PUCCH) used for cellular communications with a BS 110 via an access link or an access channel. The PSSCH 620 may be used to communicate data, similar to a PDSCH and/or a physical uplink shared channel (PUSCH) used for cellular communications with a BS 110 via an access link or an access channel. For example, the PSCCH 615 may carry sidelink control information (SCI) 630, which may indicate various control information used for sidelink communications, such as one or more resources (e.g., time resources, frequency resources, and/or spatial resources) where a transport block (TB) 635 may be carried on the PSSCH 620. The TB 635 may include data. The PSFCH 625 may be used to communicate sidelink feedback 640, such as hybrid automatic repeat request (HARQ) feedback (e.g., acknowledgement/negative acknowledgement (ACK/NACK) information), transmit power control (TPC), and/or a scheduling request (SR).

HARQ feedback provides a mechanism for indicating, to a transmitter of a communication, whether the communication was successfully received or not. For example, the transmitter may transmit scheduling information for the communication. A receiver of the scheduling information may monitor resources indicated by the scheduling information in order to receive the communication. If the receiver successfully receives the communication, the receiver may transmit an acknowledgment (ACK) in HARQ feedback. If the receiver fails to receive the communication, the receiver may transmit a negative ACK (NACK) in HARQ feedback. Thus, based at least in part on the HARQ feedback, the transmitter can determine whether the communication should be retransmitted. HARQ feedback is often implemented using a single bit, where a first value of the bit indicates an ACK and a second value of the bit indicates a NACK. Such a bit may be referred to as a HARQ-ACK bit. HARQ-ACK feedback may be conveyed in a HARQ codebook, which may include one or more bits indicating ACKs or NACKs corresponding to one or more communications and may be referred to as HARQ feedback information (or, in the case of sidelink communications, "sidelink HARQ feedback information").

A HARQ-ACK bit may be referred to as an ACK/NACK and/or a HARQ-ACK and may be associated with a HARQ process. "HARQ process" refers to the determination of whether to report an ACK or NACK associated with a transmission, a time resource associated with the transmission (e.g., a symbol or a slot), and/or a frequency resource associated with the transmission (e.g., a resource block (RB), a subchannel, a channel, a bandwidth, and/or a bandwidth part). Accordingly, an ACK/NACK may be interchangeably referred to as being associated with a transmission, a time resource, a frequency resource, and/or a HARQ process.

Although shown on the PSCCH 615, in some aspects, the SCI 630 may include multiple communications in different stages, such as a first stage SCI (SCI-1) and a second stage SCI (SCI-2). The SCI-1 may be transmitted on the PSCCH 615. The SCI-2 may be transmitted on the PSSCH 620. The SCI-1 may include, for example, an indication of one or more resources (e.g., time resources, frequency resources, and/or spatial resources) on the PSSCH 620, information for decoding sidelink communications on the PSSCH, a quality of service (QOS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 620, such as a HARQ process ID, a new data indicator (NDI), a source identifier, a destination identifier, and/or a channel state information (CSI) report trigger.

In some aspects, the one or more sidelink channels 610 may use resource pools. Resource pools may be defined for sidelink transmission and sidelink reception. A resource pool may include one or more sub-channels in the frequency domain and one or more slots in the time domain. For example, the minimum resource allocation in the frequency domain may be a sub-channel, and the minimum resource allocation in the time domain may be a slot. In some aspects, one or more slots of a resource pool may be unavailable for sidelink communications. For example, a scheduling assignment (e.g., included in SCI 630) may be transmitted in sub-channels using specific resource blocks (RBs) across time. In some aspects, data transmissions (e.g., on the PSSCH 620) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 605-1 may operate using a sidelink transmission mode (e.g., Mode 1) where resource selection and/or scheduling is performed by a BS 110 (e.g., a base station, a CU, or a DU). For example, the UE 605-1 may receive a grant (e.g., in DCI or in an RRC message, such as for configured grants) from the BS 110 (e.g., directly or via one or more network nodes) for sidelink channel access and/or scheduling. In some aspects, a UE 605-1 may operate using a transmission mode (e.g., Mode 2) where resource selection and/or scheduling is performed by the UE 605-1 (e.g., rather than a BS 110). In some aspects, the UE 605-1 may perform resource selection and/or scheduling by sensing channel availability for transmissions. For example, the UE 605-1 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 605-1 may perform resource selection and/or scheduling using SCI 630 received in the PSCCH 615, which may indicate occupied resources and/or channel parameters. Additionally, or alternatively, the UE 605-1 may perform resource selection and/or scheduling by determining a channel busy ratio (CBR) associated with various sidelink channels, which may be used for rate control (e.g., by indicating a maximum number of resource blocks that the UE 605-1 can use for a particular set of subframes).

In the transmission mode where resource selection and/or scheduling is performed by a UE 605-1, the UE 605-1 may generate sidelink grants, and may transmit the grants in SCI 630. A sidelink grant may indicate, for example, one or more parameters (e.g., transmission parameters) to be used for an upcoming sidelink transmission, such as one or more resource blocks to be used for the upcoming sidelink transmission on the PSSCH 620 (e.g., for TBs 635), one or more subframes to be used for the upcoming sidelink transmission, and/or an MCS to be used for the upcoming sidelink transmission. In some aspects, a UE 605-1 may generate a sidelink grant that indicates one or more parameters for semi-persistent scheduling (SPS), such as a periodicity of a sidelink transmission. Additionally, or alternatively, the UE 605-1 may generate a sidelink grant for event-driven scheduling, such as for an on-demand sidelink message.

As shown, a network node 650 may communicate with the UE 605-1 and/or the UE 605-2 (e.g., directly or via one or more network nodes), such as via an access link 655. A direct link between the UEs 605-1 and 605-2 (e.g., via a PC5 interface) may be referred to as a sidelink, and a direct link between a network node 650 and a UE 605-1 or 605-2 (e.g., via a Uu interface) may be referred to as an access link. Sidelink communications may be transmitted via the sidelink, and access link communications may be transmitted via the access link. An access link communication may be either a downlink communication (from the network node 650 to the UE 605-1 or 605-2) or an uplink communication (from a UE 605-1 or 605-2 to the network node 650).

Additionally, or alternatively, the UE 605-1 and/or 605-2 can perform resource selection and/or scheduling using SCI 630 received in the PSCCH 615, which can indicate occupied resources and/or channel parameters. Additionally, or alternatively, the UE 605-1 and/or 605-2 can perform resource selection and/or scheduling by determining a CBR associated with various sidelink channels, which can be used for rate control (e.g., by indicating a maximum number of resource blocks that the UE 605-1 and/or 605-2 can use for a particular set of subframes).

In the second transmission mode, the UE 605-1 and/or 605-2 can generate sidelink grants, and can transmit the grants in SCI 630. A sidelink grant can indicate, for example, one or more parameters (e.g., transmission parameters) to be used for an upcoming sidelink transmission, such as one or more resource blocks to be used for the upcoming sidelink transmission on the PSSCH 620 (e.g., for TBs 635), and/or one or more subframes to be used for the upcoming sidelink transmission. In some aspects, a UE 605-1 and/or 605-2 can generate a sidelink grant that indicates one or more parameters for SPS, such as a periodicity of a sidelink transmission. Additionally, or alternatively, the UE 605-1 and/or 605-2 can generate a sidelink grant for event-driven scheduling, such as for an on-demand sidelink message.

In some cases, a UE that is configured for receiving common messages and private messages for MIMO rate splitting can fail to receive (e.g., fail to obtain and/or decode), from a network node, a common message and/or a private message, in which case the UE will be unable to reconstruct the message corresponding to the common message and the private message. In some cases, the network node can retransmit the common message and/or the private message, but doing so consumes access link time and frequency resources, as well as energy resources at the network node.

Some aspects of the techniques and apparatuses described herein may include retransmission, via a sidelink, of a common message and/or a private message. In some aspects, for example, a second UE may receive, from a network node, at least one message. The at least one message may include at least one of a first common message directed to a first UE or a first private message directed to the first UE. The second UE may decode the at least one message and may receive, from the network node, a retransmission indication instructing the second UE to transmit, to the first UE, at least one retransmission of the at least one message. The second UE may transmit, to the first UE, the retransmission of the at least one message. In some aspects, the network node may transmit the at least one message and/or retransmit the at least one message. In some aspects, the network node and/or the second UE may provide an indication, to the first UE, of which entity (e.g., the network node and/or the second UE) will retransmit the at least one message. In this way, a receiving UE (e.g., the first UE, for which the common message and/or private message is intended) may have a greater chance of receiving the common part and the private part of the message, thereby increasing the reliability of communication without increasing the access link overhead and/or energy consumption at the network node.

As indicated above, FIG. 6 is provided as an example. Other examples may differ from what is described with respect to FIG. 6.

Figure 7:
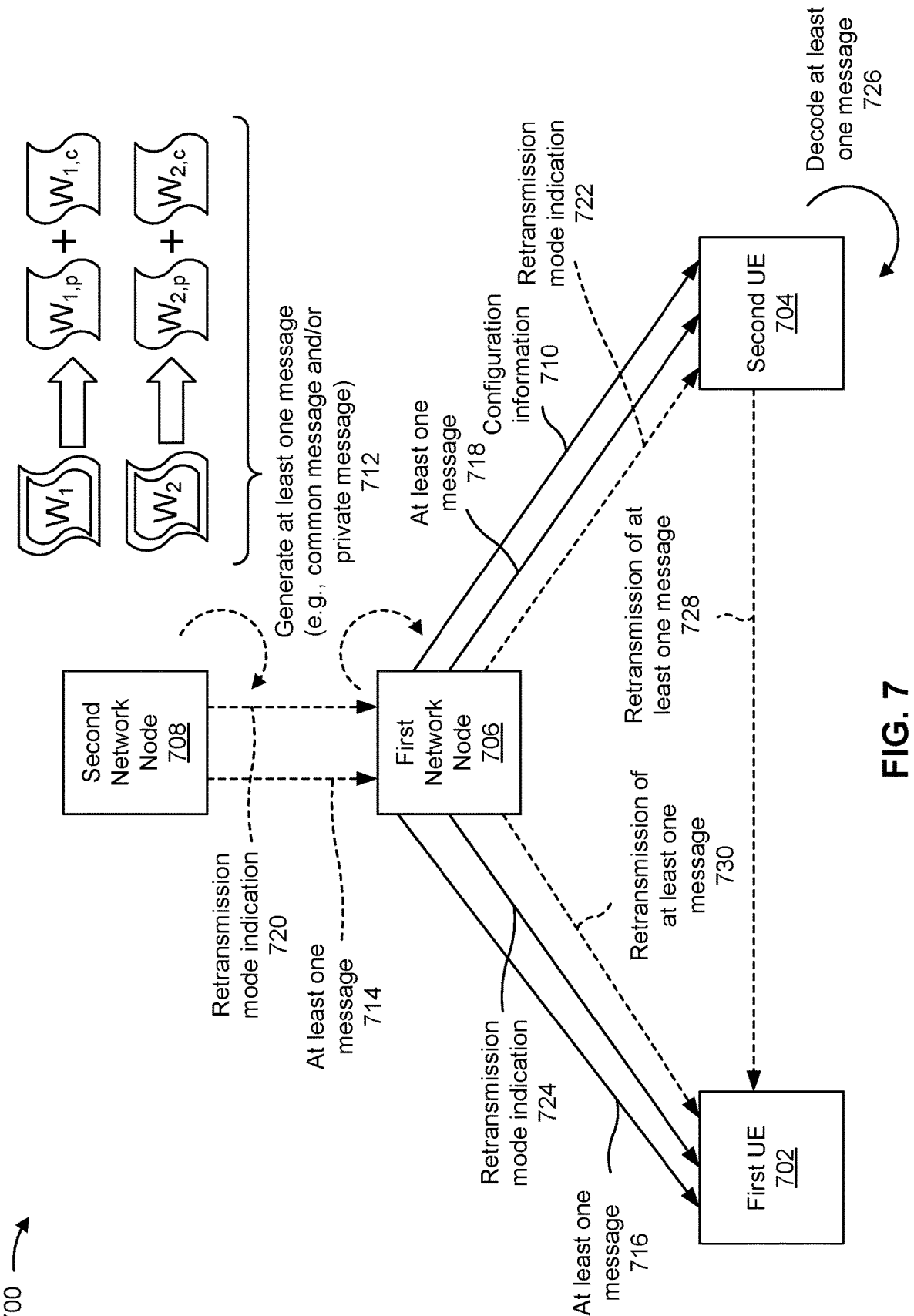
FIG. 7 is a diagram illustrating an example associated with sidelink retransmission of messages, in accordance with the present disclosure.

FIG. 7 is a diagram illustrating an example 700 associated with sidelink retransmission of messages, in accordance with the present disclosure. As shown in FIG. 7, a first UE 702, a second UE 704, and a first network node 706 may communicate with one another. In some aspects, the first network node 706 may communicate with a second network node 708. In some aspects, the first UE 702 and/or the second UE 704 may be, be similar to, include, or be included in, the UE 605-1 and/or the UE 602-2 depicted in FIG. 6, the UE 120-1 and/or the UE 120-2 depicted in FIGS. 4 and 5, and/or the UE 120 depicted in FIGS. 1-3. In some aspects, the first network node 706 and/or the second network node 708 may be, be similar to, include, or be included in, the network node 650 depicted in FIG. 6, the network node 110 depicted in FIGS. 1 and 2, and/or one or more components of the disaggregated base station architecture 300 depicted in FIG. 3. In some aspects, the first network node 706 may be a UE or a programmable logic controller (PLC).

As shown by reference number 710, the first network node 706 may transmit, and the second UE 704 may receive, configuration information. The configuration information may include configuration parameters associated with a MIMO rate splitting operation. In some aspects, the configuration information may indicate one or more priorities associated with one or more messages. For example, in some aspects, a first private message may have a first priority, a first common message may have a second priority, a second private message may have a third priority, and a second common message may have a fourth priority. In some aspects, any two of the first through fourth priorities may be the same or different. In some aspects, two or more messages may be associated with a joint priority. For example, a first private message and a first common message may be associated with a first joint priority and a second private message, and a second common message may be associated with a second joint priority.

In some aspects, at least one priority may be associated with at least one of a mode 1 sidelink resource allocation operation or a mode 2 resource allocation operation. For example, a first private message and/or a first common message may be associated with a first priority based on the first private message and the first common message being configured for retransmission based on a mode 1 sidelink resource allocation operation, and/or a second private message and/or a second common message may be associated with a second priority based on the second private message and the second common message being configured for retransmission based on a mode 2 sidelink resource allocation operation. In some aspects, a first private message and/or a first common message may be associated with a mode 1 sidelink resource allocation operation based on the first private message and/or the first common message having a first priority, and a second private message and/or a second common message may be associated with a mode 2 sidelink resource allocation operation based on the second private message and/or the second common message having a second priority.

As shown by reference number 712, the first network node 706 or the second network node 708 may generate at least one message. The at least one message may include a first common message directed to the first UE or a first private message directed to the first UE. In some aspects, for example, the first network node 706 or the second network node 708 may generate, based on a first message W1 directed to the first UE, a first private message W1,*p* and a first common message W1,*c* directed to the first UE. The first network node 706 or the second network node 708 also may generate, based on a second message W2 directed to the second UE, a second private message W1,*p* and a second common message W1,*c* directed to the second UE.

As shown by reference number 714, in aspects in which the second network node 708 generates the at least one message, the second network node 708 may transmit, and the first network node 706 may receive, the at least one message. As shown by reference number 716, the first network node 706 may transmit, and the first UE 702 may receive, the at least one message. As shown by reference number 718, the first network node 706 may transmit, and the second UE 704 may receive, the at least one message.

As shown by reference number 720, the second network node 708 may transmit, and the first network node 706 may receive, a retransmission mode indication. The retransmission mode indication may indicate the entity or entities that are to transmit at least one retransmission of the at least one message. For example, the retransmission mode indication may indicate a retransmission mode. In a first retransmission mode, the first network node 706 may retransmit the at least one message. In a second retransmission mode, the second UE 704 may retransmit the at least one message. In a third retransmission mode, both the first network node 706 and the second UE 704 may retransmit the at least one message.

In some aspects, the second UE 704 may transmit the retransmission mode indication. As shown by reference number 722, the first network node 706 may transmit, and the second UE 704 may receive, a retransmission mode indication. For example, the first network node 706 may transmit the retransmission mode indication via an access link. In some aspects, the network node 706 may transmit the retransmission mode indication via an access link layer 1 communication such as, for example, downlink control information (DCI) and/or an access link wake-up signal. In some aspects, the network node 706 may transmit the retransmission mode indication via an access link layer 2 communication such as, for example, an access link medium access control (MAC) control element (MAC CE). In some aspects, the network node 706 may transmit the retransmission mode indication via an access link layer 3 communication, such as, for example, an access link radio resource control (RRC) message.

In some aspects, the second UE 704 may transmit the retransmission mode indication via a PC5 interface. For example, the second UE 704 may transmit the retransmission mode indication via a PC5 layer 1 communication such as, for example, sidelink control information (SCI), a dedicated physical sidelink control channel communication (PSCCH), and/or a sidelink wake-up signal, among other examples. In some aspects, the second UE 704 may transmit the retransmission mode indication via a PC5 layer 2 communication such as, for example, a PC5 MAC CE. In some aspects, the second UE 704 may transmit the retransmission mode indication via a PC5 layer 3 communication such as, for example, a PC5 RRC message.

As shown by reference number 726, the second UE 704 may decode the at least one message. As shown by reference number 728, the second UE 704 may transmit, and the first UE 702 may receive, a retransmission of the at least one message. In some aspects, for example, the second UE 704 may transmit the retransmission of the at least one message based on a retransmission mode indication received from the first network node 706. In some aspects, the second UE 704 may transmit the retransmission using a sidelink resource allocation received from the first network node 706. For example, the first network node 706 may transmit, and the second UE 704 may receive, a sidelink resource allocation associated with a set of allocated sidelink resources (e.g., in association with a mode 1 sidelink resource allocation operation) and may transmit the retransmission of the at least one message using the set of allocated sidelink resources. In some aspects, the second UE 704 may transmit, and the first network node 706 may receive, a sidelink resource allocation request. The network node 706 may transmit the sidelink resource allocation based on receiving the request. In some aspects, the second UE 704 may select a set of sidelink resources (e.g., in association with a mode 2 sidelink resource allocation operation) and may transmit the retransmission of the at least one message using the set of sidelink resources. In some aspects, the second UE 704 may receive, from the first UE, a set of selected sidelink resources, wherein transmitting the retransmission of the at least one message comprises transmitting the retransmission of the at least one message using the set of selected sidelink resources.

In some aspects, the second UE 704 may transmit the retransmission of the at least one message based on at least one priority. For example, the second UE 704 may transmit the retransmission based on at least one priority of the at least one message satisfying a priority condition. The priority condition may be satisfied, for example, based on the at least one priority being higher than a priority threshold and/or based on the at least one priority being associated with a retransmission mode, among other examples. In some aspects, the second UE 704 may transmit the at least one retransmission of the at least one message based on a retransmission mode corresponding to the second UE, wherein the retransmission mode is based on at least one of a priority associated with the at least one message or a function of a remaining delay associated with the at least one message. In some aspects, for example, the second UE 704 may transmit the at least one retransmission of the at least one message based on at least one delay parameter. In some aspects, for example, the at least one message may include the first common message and the first private message, and the at least one delay parameter may include a first delay parameter associated with the first common message and a second delay parameter associated with the first private message. The at least one delay parameter may include, for example, a remaining packet delay budget.

In some aspects, as shown by reference number 730, the first network node 706 may transmit, and the first UE 702 may receive, a retransmission of the at least one message. For example, the first network node 706 may transmit the at least one retransmission based on a retransmission mode corresponding to the first network node 706. The retransmission mode may be based on at least one of a priority associated with the at least one message or a function of a remaining delay associated with the at least one message. In some aspects, the first network node 706 may transmit, and the second UE 704 may receive, configuration information indicating the function of the remaining delay. In some aspects, the second network node 708 may transmit, and the first network node 706 may receive, the at least one retransmission based on at least one delay parameter. In some aspects, the second network node 708 may transmit, and the first network node 706 may receive, configuration information indicating the function of the remaining delay.

As indicated above, FIG. 7 is provided as an example. Other examples may differ from what is described with respect to FIG. 7.

FIG. 8 is a diagram illustrating an example process 800 performed, for example, by a second UE, in accordance with the present disclosure. Example process 800 is an example where the second UE (e.g., UE 704) performs operations associated with sidelink retransmission of messages.

As shown in FIG. 8, in some aspects, process 800 may include receiving, from a network node, at least one message, the at least one message comprising at least one of a first common message directed to a first UE or a first private message directed to the first UE (block 810). For example, the second UE (e.g., using reception component 1002 and/or communication manager 1006, depicted in FIG. 10) may receive, from a network node, at least one message, the at least one message comprising at least one of a first common message directed to a first UE or a first private message directed to the first UE, as described above.

As further shown in FIG. 8, in some aspects, process 800 may include decoding the at least one message (block 820). For example, the second UE (e.g., using communication manager 1006, depicted in FIG. 10) may decode the at least one message, as described above.

As further shown in FIG. 8, in some aspects, process 800 may include receiving, from the network node, a retransmission indication instructing the second UE to transmit, to the first UE, at least one retransmission of the at least one message (block 830). For example, the second UE (e.g., using reception component 1002 and/or communication manager 1006, depicted in FIG. 10) may receive, from the network node, a retransmission indication instructing the second UE to transmit, to the first UE, at least one retransmission of the at least one message, as described above.

As further shown in FIG. 8, in some aspects, process 800 may include transmitting, to the first UE, the at least one retransmission of the at least one message (block 840). For example, the second UE (e.g., using transmission component 1004 and/or communication manager 1006, depicted in FIG. 10) may transmit, to the first UE, the at least one retransmission of the at least one message, as described above.

Process 800 may include additional aspects, such as any single aspect or any combination of aspects described below and/or in connection with one or more other processes described elsewhere herein.

In a first aspect, process 800 includes receiving, from the network node, a sidelink resource allocation associated with a set of allocated sidelink resources, wherein transmitting the at least one retransmission of the at least one message comprises transmitting the at least one retransmission of the at least one message using the set of allocated sidelink resources. In a second aspect, alone or in combination with the first aspect, process 800 includes selecting a set of sidelink resources, wherein transmitting the at least one retransmission of the at least one message comprises transmitting the at least one retransmission of the at least one message using the set of sidelink resources. In a third aspect, alone or in combination with one or more of the first and second aspects, the network node includes at least one of a third UE or a PLC.

In a fourth aspect, alone or in combination with the third aspect, process 800 includes transmitting, to an additional network node, a sidelink resource allocation request, and receiving, from the additional network node, a sidelink resource allocation associated with a set of allocated sidelink resources, wherein transmitting the at least one retransmission of the at least one message comprises transmitting the at least one retransmission of the at least one message using the set of allocated sidelink resources. In a fifth aspect, alone or in combination with the third aspect, process 800 includes receiving, from the network node, a set of selected sidelink resources, wherein transmitting the at least one retransmission of the at least one message comprises transmitting the at least one retransmission of the at least one message using the set of selected sidelink resources. In a sixth aspect, alone or in combination with the third aspect, process 800 includes receiving, from the first UE, a set of selected sidelink resources, wherein transmitting the at least one retransmission of the at least one message comprises transmitting the at least one retransmission of the at least one message using the set of selected sidelink resources. In a seventh aspect, alone or in combination with the third aspect, process 800 includes selecting a set of selected sidelink resources, wherein transmitting the at least one retransmission of the at least one message comprises transmitting the at least one retransmission of the at least one message using the set of selected sidelink resources.

In an eighth aspect, alone or in combination with one or more of the first through seventh aspects, at least one priority is associated with the at least one message. In a ninth aspect, alone or in combination with the eighth aspect, the at least one priority comprises a first priority associated with the first common message and a second priority associated with the first private message. In a tenth aspect, alone or in combination with the eighth aspect, the at least one priority comprises a joint priority associated with the first common message and the first private message. In an eleventh aspect, alone or in combination with one or more of the eighth through tenth aspects, process 800 includes receiving configuration information indicating the at least one priority. In a twelfth aspect, alone or in combination with one or more of the eighth through eleventh aspects, the at least one priority is associated with at least one of a mode 1 sidelink resource allocation operation or a mode 2 resource allocation operation. In a thirteenth aspect, alone or in combination with one or more of the eighth through twelfth aspects, transmitting the at least one retransmission of the at least one message comprises transmitting the at least one of the first common message or the first private message based on the at least one priority.

In a fourteenth aspect, alone or in combination with one or more of the first through thirteenth aspects, process 800 includes transmitting a retransmission mode indication indicating that the at least one retransmission is to be transmitted by the second UE. In a fifteenth aspect, alone or in combination with the fourteenth aspect, transmitting the retransmission mode indication comprises transmitting the retransmission mode indication via a PC5 interface. In a sixteenth aspect, alone or in combination with the fifteenth aspect, transmitting the retransmission mode indication via the PC5 interface comprises transmitting the retransmission mode indication via a PC5 layer 1 communication. In a seventeenth aspect, alone or in combination with the sixteenth aspect, the PC5 layer 1 communication comprises at least one of sidelink control information, a dedicated physical sidelink control channel communication, or a sidelink wake-up signal. In an eighteenth aspect, alone or in combination with the fifteenth aspect, transmitting the retransmission mode indication via the PC5 interface comprises transmitting the retransmission mode indication via a PC5 layer 2 communication. In a nineteenth aspect, alone or in combination with the eighteenth aspect, the PC5 layer 2 communication comprises a PC5 medium access control (MAC) control element (MAC CE). In a twentieth aspect, alone or in combination with the fifteenth aspect, transmitting the retransmission mode indication via the PC5 interface comprises transmitting the retransmission mode indication via a PC5 layer 3 communication. In a twenty-first aspect, alone or in combination with the twentieth aspect, the PC5 layer 3 communication comprises a PC5 radio resource control (RRC) message.

In a twenty-second aspect, alone or in combination with one or more of the first through twenty-first aspects, transmitting the at least one retransmission of the at least one message comprises transmitting the at least one retransmission based on a retransmission mode corresponding to the second UE, wherein the retransmission mode is based on at least one of a priority associated with the at least one message or a function of a remaining delay associated with the at least one message. In a twenty-third aspect, alone or in combination with the twenty-second aspect, process 800 includes transmitting a retransmission mode indication indicating the priority. In a twenty-fourth aspect, alone or in combination with one or more of the first through twenty-third aspects, transmitting the at least one retransmission of the at least one message comprises transmitting the at least one retransmission based on at least one delay parameter. In a twenty-fifth aspect, alone or in combination with the twenty-fourth aspect, the at least one message comprises the first common message and the first private message, and the at least one delay parameter comprises a first delay parameter associated with the first common message and a second delay parameter associated with the first private message. In a twenty-sixth aspect, alone or in combination with one or more of the twenty-fourth or twenty-fifth aspects, the at least one delay parameter comprises a remaining packet delay budget.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a first UE, in accordance with the present disclosure. Example process 900 is an example where the first UE (e.g., UE 702) performs operations associated with sidelink retransmission for rate splitting messages.

As shown in FIG. 9, in some aspects, process 900 may include receiving, from a first network node, at least one message, the at least one message comprising at least one of a first common message directed to the first UE or a first private message directed to the first UE (block 910). For example, the first UE (e.g., using reception component 1002 and/or communication manager 1006, depicted in FIG. 10) may receive, from a first network node, at least one message, the at least one message comprising at least one of a first common message directed to the first UE or a first private message directed to the first UE, as described above.

As further shown in FIG. 9, in some aspects, process 900 may include receiving, from at least one of the first network node or a second network node and based on a failure, by the first UE, to decode the at least one message, at least one retransmission of the at least one message (block 920). For example, the first UE (e.g., using reception component 1002 and/or communication manager 1006, depicted in FIG. 10) may receive, from at least one of the first network node or a second network node and based on a failure, by the first UE, to decode the at least one message, at least one retransmission of the at least one message, as described above.

Process 900 may include additional aspects, such as any single aspect or any combination of aspects described below and/or in connection with one or more other processes described elsewhere herein.

In a first aspect, receiving the at least one retransmission of the at least one message comprises receiving, from the first network node, a first retransmission of the at least one message, and receiving, from the second network node, a second retransmission of the at least one message. In a second aspect, alone or in combination with the first aspect, the second network node comprises at least one of a second UE or a PLC. In a third aspect, alone or in combination with one or more of the first and second aspects, process 900 includes receiving a retransmission mode indication indicating that the at least one retransmission is to be transmitted by the at least one of the first network node or the second network node. In a fourth aspect, alone or in combination with the third aspect, receiving the retransmission mode indication comprises receiving the retransmission mode indication via a PC5 interface. In a fifth aspect, alone or in combination with the fourth aspect, receiving the retransmission mode indication via the PC5 interface comprises receiving the retransmission mode indication via a PC5 layer 1 communication. In a sixth aspect, alone or in combination with the fifth aspect, the PC5 layer 1 communication comprises at least one of sidelink control information, a dedicated physical sidelink control channel communication, or a sidelink wake-up signal.

In a seventh aspect, alone or in combination with the fourth aspect, receiving the retransmission mode indication via the PC5 interface comprises receiving the retransmission mode indication via a PC5 layer 2 communication. In an eighth aspect, alone or in combination with the seventh aspect, the PC5 layer 2 communication comprises a PC5 MAC CE. In a ninth aspect, alone or in combination with the fourth aspect, receiving the retransmission mode indication via the PC5 interface comprises receiving the retransmission mode indication via a PC5 layer 3 communication. In a tenth aspect, alone or in combination with the ninth aspect, the PC5 layer 3 communication comprises a PC5 RRC message.

In an eleventh aspect, alone or in combination with the fourth aspects, receiving the retransmission mode indication comprises receiving the retransmission mode indication via an access link. In a twelfth aspect, alone or in combination with the eleventh aspect, receiving the retransmission mode indication via the access link comprises receiving the retransmission mode indication via an access link layer 1 communication. In a thirteenth aspect, alone or in combination with the twelfth aspect, the access link layer 1 communication comprises at least one of DCI or an access link wake-up signal. In a fourteenth aspect, alone or in combination with the eleventh aspect, receiving the retransmission mode indication via the access link comprises receiving the retransmission mode indication via an access link layer 2 communication. In a fifteenth aspect, alone or in combination with the fourteenth aspect, the access link layer 2 communication comprises an access link MAC CE. In a sixteenth aspect, alone or in combination with the eleventh aspect, receiving the retransmission mode indication via the access link comprises receiving the retransmission mode indication via an access link layer 3 communication. In a seventeenth aspect, alone or in combination with the sixteenth aspect, the access link layer 3 communication comprises an access link RRC message.

In an eighteenth aspect, alone or in combination with one or more of the first through seventeenth aspects, receiving the at least one retransmission of the at least one message comprises receiving the at least one retransmission based on a retransmission mode corresponding to the at least one of the first network node or the second network node, wherein the retransmission mode is based on at least one of a priority associated with the at least one message or a function of a remaining delay associated with the at least one message. In a nineteenth aspect, alone or in combination with the eighteenth aspect, process 900 includes receiving a retransmission mode indication indicating the priority. In a twentieth aspect, alone or in combination with one or more of the eighteenth or nineteenth aspects, process 900 includes receiving configuration information indicating the function of the remaining delay.

In a twenty-first aspect, alone or in combination with one or more of the first through twentieth aspects, receiving the at least one retransmission of the at least one message comprises receiving the at least one retransmission based on at least one delay parameter. In a twenty-second aspect, alone or in combination with the twenty-first aspect, the at least one message comprises the first common message and the first private message, and the at least one delay parameter comprises a first delay parameter associated with the first common message and a second delay parameter associated with the first private message. In a twenty-third aspect, alone or in combination with one or more of the twenty-first or twenty-second aspects, the at least one delay parameter comprises a remaining packet delay budget.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
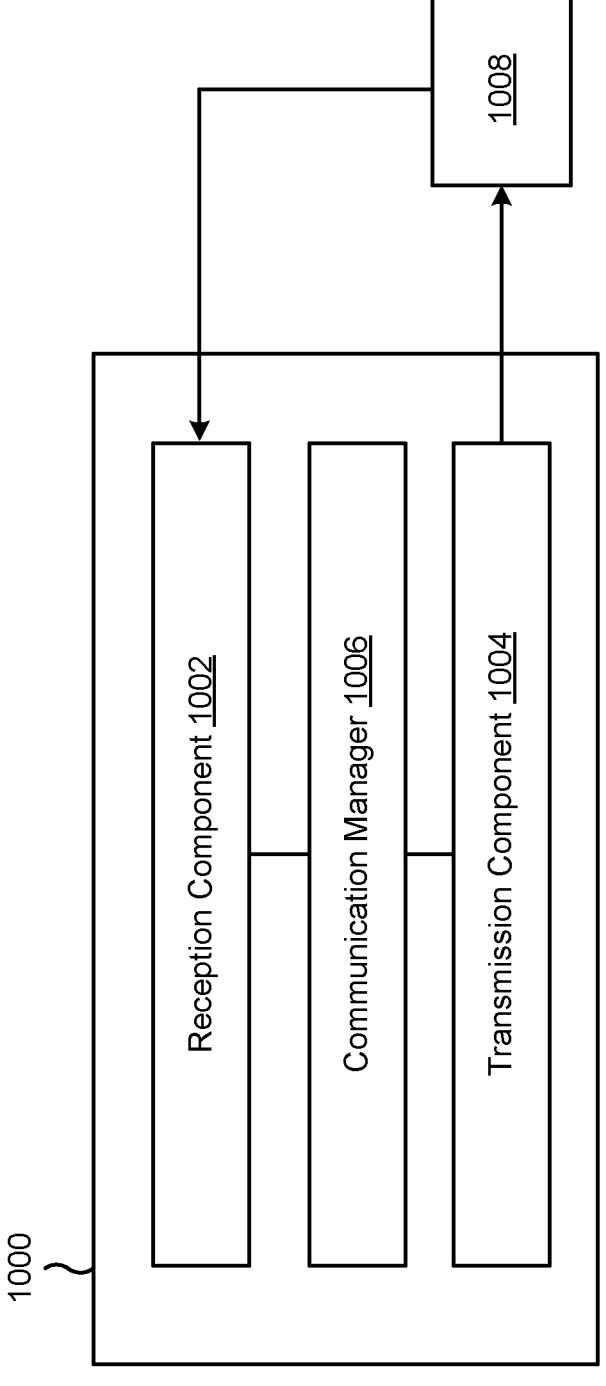
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

In some examples, means for transmitting, outputting, or sending (or means for outputting for transmission) may include one or more antennas, a modulator, a transmit MIMO processor, a transmit processor, or a combination thereof, of the UE described above in connection with FIG. 2.

In some examples, means for receiving (or means for obtaining) may include one or more antennas, a demodulator, a MIMO detector, a receive processor, or a combination thereof, of the UE described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for obtaining, receiving, outputting, transmitting, generating, retransmitting, decoding, and/or processing may include various processing system components, such as a receive processor, a transmit processor, a controller/processor, a memory, or a combination thereof, of the UE described above in connection with FIG. 2.

The reception component 1002 may receive, from a network node, at least one message, the at least one message comprising at least one of a first common message directed to a first UE or a first private message directed to the first UE. The communication manager 1006 may decode the at least one message. The reception component 1002 may receive, from the network node, a retransmission indication instructing the second UE to transmit, to the first UE, a retransmission of the at least one message. The transmission component 1004 may transmit, to the first UE, the at least one retransmission of the at least one message.

The reception component 1002 may receive, from the network node, a sidelink resource allocation associated with a set of allocated sidelink resources, wherein transmitting the at least one retransmission of the at least one message comprises transmitting the at least one retransmission of the at least one message using the set of allocated sidelink resources. The communication manager 1006 may select a set of sidelink resources, wherein transmitting the at least one retransmission of the at least one message comprises transmitting the at least one retransmission of the at least one message using the set of sidelink resources. The transmission component 1004 may transmit, to an additional network node, a sidelink resource allocation request. The reception component 1002 may receive, from the additional network node, a sidelink resource allocation associated with a set of allocated sidelink resources, wherein transmitting the at least one retransmission of the at least one message comprises transmitting the at least one retransmission of the at least one message using the set of allocated sidelink resources.

The reception component 1002 may receive, from the network node, a set of selected sidelink resources, wherein transmitting the at least one retransmission of the at least one message comprises transmitting the at least one retransmission of the at least one message using the set of selected sidelink resources. The reception component 1002 may receive, from the first UE, a set of selected sidelink resources, wherein transmitting the at least one retransmission of the at least one message comprises transmitting the at least one retransmission of the at least one message using the set of selected sidelink resources. The communication manager 1006 may select a set of selected sidelink resources, wherein transmitting the at least one retransmission of the at least one message comprises transmitting the at least one retransmission of the at least one message using the set of selected sidelink resources.

The reception component 1002 may receive configuration information indicating at least one priority. The transmission component 1004 may transmit a retransmission mode indication indicating that the at least one retransmission is to be transmitted by the second UE. The transmission component 1004 may transmit a retransmission mode indication indicating the priority.

The reception component 1002 may receive, from a first network node, at least one message, the at least one message comprising at least one of a first common message directed to a first UE or a first private message directed to the first UE. The reception component 1002 may receive, from at least one of the first network node or a second network node and based on a failure, by the first UE, to decode the at least one message, at least one retransmission of the at least one message. The reception component 1002 may receive a retransmission mode indication indicating that the at least one retransmission is to be transmitted by the at least one of the first network node or the second network node. The reception component 1002 may receive a retransmission mode indication indicating the priority. The reception component 1002 may receive configuration information indicating the function of the remaining delay.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
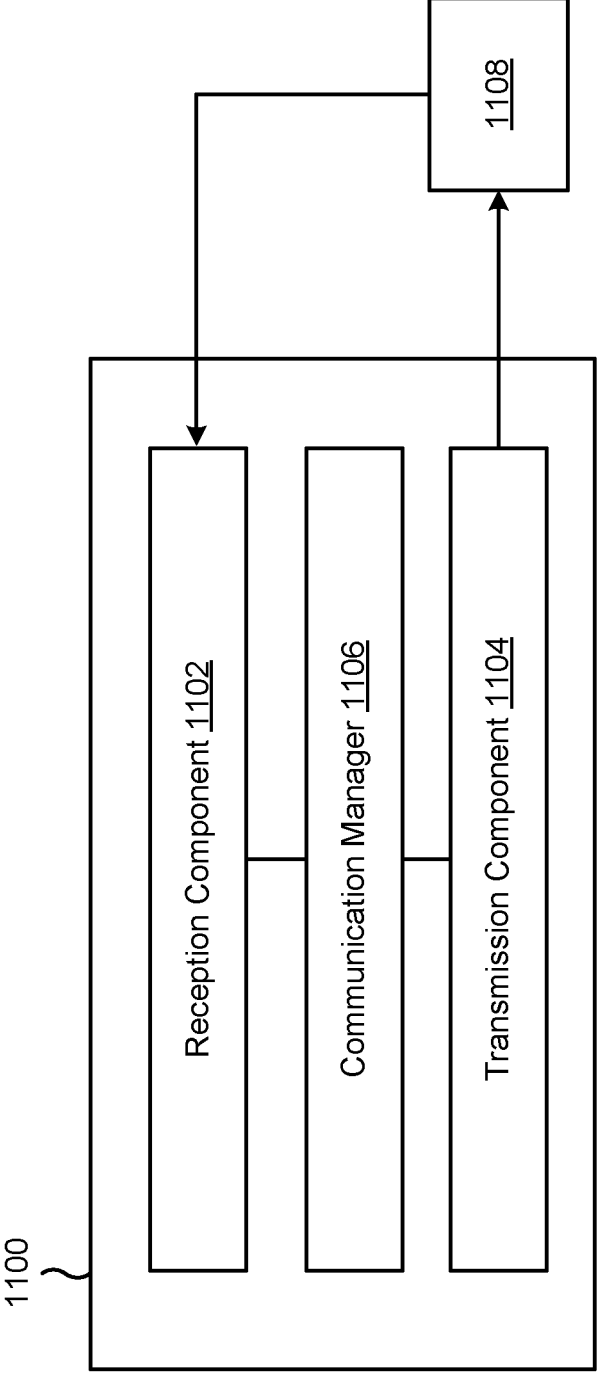
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIG. 7. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

In some examples, means for receiving (or means for obtaining) may include one or more antennas, a demodulator, a MIMO detector, a receive processor, or a combination thereof, of the network node described above in connection with FIG. 2.

In some cases, rather than actually transmitting, for example, signals and/or data, a device may have an interface to output signals and/or data for transmission (a means for outputting). For example, a processor may output signals and/or data, via a bus interface, to an RF front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for obtaining, receiving, outputting, transmitting, generating, retransmitting, decoding, and/or processing may include various processing system components, such as a receive processor, a transmit processor, a controller/processor, a memory, or a combination thereof, of the network node described above in connection with FIG. 2.

In some aspects, the communication manager 1106 and/or the transmission component 1104 may generate and provide resource allocations to a UE for sidelink communications. The transmission component 1104 may transmit common and/or private messages to one or more UEs. The reception component 1102 may receive feedback from one or more UEs.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a second user equipment (UE), comprising: receiving, from a network node, at least one message, the at least one message comprising at least one of a first common message directed to a first UE or a first private message directed to the first UE; decoding the at least one message; receiving, from the network node, a retransmission indication instructing the second UE to transmit, to the first UE, a retransmission of the at least one message; and transmitting, to the first UE, the at least one retransmission of the at least one message.

Aspect 2: The method of Aspect 1, further comprising receiving, from the network node, a sidelink resource allocation associated with a set of allocated sidelink resources, wherein transmitting the at least one retransmission of the at least one message comprises transmitting the at least one retransmission of the at least one message using the set of allocated sidelink resources.

Aspect 3: The method of any of Aspects 1-2, further comprising selecting a set of sidelink resources, wherein transmitting the at least one retransmission of the at least one message comprises transmitting the at least one retransmission of the at least one message using the set of sidelink resources.

Aspect 4: The method of any of Aspects 1-3, wherein the network node comprises at least one of a third UE or a programmable logic controller (PLC).

Aspect 5: The method of Aspect 4, further comprising: transmitting, to an additional network node, a sidelink resource allocation request; and receiving, from the additional network node, a sidelink resource allocation associated with a set of allocated sidelink resources, wherein transmitting the at least one retransmission of the at least one message comprises transmitting the at least one retransmission of the at least one message using the set of allocated sidelink resources.

Aspect 6: The method of any of Aspects 4-5, further comprising receiving, from the network node, a set of selected sidelink resources, wherein transmitting the at least one retransmission of the at least one message comprises transmitting the at least one retransmission of the at least one message using the set of selected sidelink resources.

Aspect 7: The method of any of Aspects 4-6, further comprising receiving, from the first UE, a set of selected sidelink resources, wherein transmitting the at least one retransmission of the at least one message comprises transmitting the at least one retransmission of the at least one message using the set of selected sidelink resources.

Aspect 8: The method of any of Aspects 4-7, further comprising selecting a set of selected sidelink resources, wherein transmitting the at least one retransmission of the at least one message comprises transmitting the at least one retransmission of the at least one message using the set of selected sidelink resources.

Aspect 9: The method of any of Aspects 1-8, wherein at least one priority is associated with the at least one message.

Aspect 10: The method of Aspect 9, wherein the at least one priority comprises a first priority associated with the first common message and a second priority associated with the first private message.

Aspect 11: The method of any of Aspects 9-10, wherein the at least one priority comprises a joint priority associated with the first common message and the first private message.

Aspect 12: The method of any of Aspects 9-11, further comprising receiving configuration information indicating the at least one priority.

Aspect 13: The method of any of Aspects 9-12, wherein the at least one priority is associated with at least one of a mode 1 sidelink resource allocation operation or a mode 2 resource allocation operation.

Aspect 14: The method of any of Aspects 9-13, wherein transmitting the at least one retransmission of the at least one message comprises transmitting the at least one of the first common message or the first private message based on the at least one priority.

Aspect 15: The method of any of Aspects 1-14, further comprising transmitting a retransmission mode indication indicating that the at least one retransmission is to be transmitted by the second UE.

Aspect 16: The method of Aspect 15, wherein transmitting the retransmission mode indication comprises transmitting the retransmission mode indication via a PC5 interface.

Aspect 17: The method of Aspect 16, wherein transmitting the retransmission mode indication via the PC5 interface comprises transmitting the retransmission mode indication via a PC5 layer 1 communication.

Aspect 18: The method of Aspect 17, wherein the PC5 layer 1 communication comprises at least one of sidelink control information, a dedicated physical sidelink control channel communication, or a sidelink wake-up signal.

Aspect 19: The method of Aspect 16, wherein transmitting the retransmission mode indication via the PC5 interface comprises transmitting the retransmission mode indication via a PC5 layer 2 communication.

Aspect 20: The method of Aspect 19, wherein the PC5 layer 2 communication comprises a PC5 medium access control (MAC) control element (MAC CE).

Aspect 21: The method of Aspect 16, wherein transmitting the retransmission mode indication via the PC5 interface comprises transmitting the retransmission mode indication via a PC5 layer 3 communication.

Aspect 22: The method of Aspect 21, wherein the PC5 layer 3 communication comprises a PC5 radio resource control (RRC) message.

Aspect 23: The method of any of Aspects 1-22, wherein transmitting the at least one retransmission of the at least one message comprises transmitting the at least one retransmission based on a retransmission mode corresponding to the second UE, wherein the retransmission mode is based on at least one of a priority associated with the at least one message or a function of a remaining delay associated with the at least one message.

Aspect 24: The method of Aspect 23, further comprising transmitting a retransmission mode indication indicating the priority.

Aspect 25: The method of any of Aspects 1-24, wherein transmitting the at least one retransmission of the at least one message comprises transmitting the at least one retransmission based on at least one delay parameter.

Aspect 26: The method of Aspect 25, wherein the at least one message comprises the first common message and the first private message, and wherein the at least one delay parameter comprises a first delay parameter associated with the first common message and a second delay parameter associated with the first private message.

Aspect 27: The method of either of claim 25 or 26, wherein the at least one delay parameter comprises a remaining packet delay budget.

Aspect 28: A method of wireless communication performed by a first user equipment (UE), comprising: receiving, from a first network node, at least one message, the at least one message comprising at least one of a first common message directed to a first user equipment (UE) or a first private message directed to the first UE; and receiving, from at least one of the first network node or a second network node and based on a failure, by the first UE, to decode the at least one message, at least one retransmission of the at least one message.

Aspect 29: The method of Aspect 28, wherein receiving the at least one retransmission of the at least one message comprises: receiving, from the first network node, a first retransmission of the at least one message; and receiving, from the second network node, a second retransmission of the at least one message.

Aspect 30: The method of Aspect 29, wherein the second network node comprises at least one of a second UE or a programmable logic controller (PLC).

Aspect 31: The method of any of Aspects 28-30, further comprising receiving a retransmission mode indication indicating that the at least one retransmission is to be transmitted by the at least one of the first network node or the second network node.

Aspect 32: The method of Aspect 31, wherein receiving the retransmission mode indication comprises receiving the retransmission mode indication via a PC5 interface.

Aspect 33: The method of Aspect 32, wherein receiving the retransmission mode indication via the PC5 interface comprises receiving the retransmission mode indication via a PC5 layer 1 communication.

Aspect 34: The method of Aspect 33, wherein the PC5 layer 1 communication comprises at least one of sidelink control information, a dedicated physical sidelink control channel communication, or a sidelink wake-up signal.

Aspect 35: The method of Aspect 32, wherein receiving the retransmission mode indication via the PC5 interface comprises receiving the retransmission mode indication via a PC5 layer 2 communication.

Aspect 36: The method of Aspect 35, wherein the PC5 layer 2 communication comprises a PC5 medium access control (MAC) control element (MAC CE).

Aspect 37: The method of Aspect 32, wherein receiving the retransmission mode indication via the PC5 interface comprises receiving the retransmission mode indication via a PC5 layer 3 communication.

Aspect 38: The method of Aspect 37, wherein the PC5 layer 3 communication comprises a PC5 radio resource control (RRC) message.

Aspect 39: The method of Aspect 32, wherein receiving the retransmission mode indication comprises receiving the retransmission mode indication via an access link.

Aspect 40: The method of Aspect 39, wherein receiving the retransmission mode indication via the access link comprises receiving the retransmission mode indication via an access link layer 1 communication.

Aspect 41: The method of Aspect 40, wherein the access link layer 1 communication comprises at least one of downlink control information (DCI) or an access link wake-up signal.

Aspect 42: The method of Aspect 39, wherein receiving the retransmission mode indication via the access link comprises receiving the retransmission mode indication via an access link layer 2 communication.

Aspect 43: The method of Aspect 42, wherein the access link layer 2 communication comprises an access link medium access control (MAC) control element (MAC CE).

Aspect 44: The method of Aspect 39, wherein receiving the retransmission mode indication via the access link comprises receiving the retransmission mode indication via an access link layer 3 communication.

Aspect 45: The method of Aspect 44, wherein the access link layer 3 communication comprises an access link radio resource control (RRC) message.

Aspect 46: The method of any of Aspects 28-45, wherein receiving the at least one retransmission of the at least one message comprises receiving the at least one retransmission based on a retransmission mode corresponding to the at least one of the first network node or the second network node, wherein the retransmission mode is based on at least one of a priority associated with the at least one message or a function of a remaining delay associated with the at least one message.

Aspect 47: The method of Aspect 46, further comprising receiving a retransmission mode indication indicating the priority.

Aspect 48: The method of either of any of Aspects 46 or 47, further comprising receiving configuration information indicating the function of the remaining delay.

Aspect 49: The method of any of Aspects 28-48, wherein receiving the at least one retransmission of the at least one message comprises receiving the at least one retransmission based on at least one delay parameter.

Aspect 50: The method of Aspect 49, wherein the at least one message comprises the first common message and the first private message, and wherein the at least one delay parameter comprises a first delay parameter associated with the first common message and a second delay parameter associated with the first private message.

Aspect 51: The method of either of any of Aspects 49 or 50, wherein the at least one delay parameter comprises a remaining packet delay budget.

Aspect 52: An apparatus for wireless communication at a device, comprising a processor; memory coupled with the processor; and instructions stored in the memory and executable by the processor to cause the apparatus to perform the method of one or more of Aspects 1-27.

Aspect 53: A device for wireless communication, comprising a memory and one or more processors coupled to the memory, the one or more processors configured to perform the method of one or more of Aspects 1-27.

Aspect 54: An apparatus for wireless communication, comprising at least one means for performing the method of one or more of Aspects 1-27.

Aspect 55: A non-transitory computer-readable medium storing code for wireless communication, the code comprising instructions executable by a processor to perform the method of one or more of Aspects 1-27.

Aspect 56: A non-transitory computer-readable medium storing a set of instructions for wireless communication, the set of instructions comprising one or more instructions that, when executed by one or more processors of a device, cause the device to perform the method of one or more of Aspects 1-27.

Aspect 57: An apparatus for wireless communication at a device, comprising a processor; memory coupled with the processor; and instructions stored in the memory and executable by the processor to cause the apparatus to perform the method of one or more of Aspects 28-51.

Aspect 58: A device for wireless communication, comprising a memory and one or more processors coupled to the memory, the one or more processors configured to perform the method of one or more of Aspects 28-51.

Aspect 59: An apparatus for wireless communication, comprising at least one means for performing the method of one or more of Aspects 28-51.

Aspect 60: A non-transitory computer-readable medium storing code for wireless communication, the code comprising instructions executable by a processor to perform the method of one or more of Aspects 28-51.

Aspect 61: A non-transitory computer-readable medium storing a set of instructions for wireless communication, the set of instructions comprising one or more instructions that, when executed by one or more processors of a device, cause the device to perform the method of one or more of Aspects 28-51.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A second user equipment (UE) for wireless communication, comprising:
a memory; and
one or more processors coupled to the memory and configured to cause the second UE to:
receive, from a network node, a plurality of messages, the plurality of messages comprising a common message and a private message directed to a first UE;
decode the plurality of messages;
receive, from the network node, a retransmission indication instructing the second UE to transmit, to the first UE, at least one retransmission of the plurality of messages; and transmit, to the first UE, the at least one retransmission of the plurality of messages, wherein the common message is retransmitted in accordance with a first delay parameter and the private message is retransmitted in accordance with a second delay parameter, the first delay parameter and the second delay parameter based at least in part on a remaining packet delay budget.

2. The second UE of claim 1,
wherein the one or more processors are further configured to cause the second UE to receive, from the network node, a sidelink resource allocation associated with a set of allocated sidelink resources, wherein the one or more processors, to cause the second UE to transmit the at least one retransmission of the plurality of messages, are configured to cause the second UE to transmit the at least one retransmission of the plurality of messages using the set of allocated sidelink resources.

3. The second UE of claim 1,
wherein the one or more processors are further configured to cause the second UE to select a set of sidelink resources, wherein the one or more processors, to cause the second UE to transmit the retransmission of the plurality of messages, are configured to cause the second UE to transmit the retransmission of the plurality of messages using the set of sidelink resources.

4. The second UE of claim 1,
wherein the network node comprises at least one of a third UE or a programmable logic controller (PLC).

5. The second UE of claim 4,
wherein the one or more processors are further configured to cause the second UE to:
transmit, to an additional network node, a sidelink resource allocation request; and
receive, from the additional network node, a sidelink resource allocation associated with a set of allocated sidelink resources, wherein the one or more processors, to cause the second UE to transmit the retransmission of the plurality of messages, are configured to cause the second UE to transmit the retransmission of the plurality of messages using the set of allocated sidelink resources.

6. The second UE of claim 4,
wherein the one or more processors are further configured to cause the second UE to receive, from the network node, a set of selected sidelink resources, wherein the one or more processors, to cause the second UE to transmit the retransmission of the plurality of messages, are configured to cause the second UE to transmit the retransmission of the plurality of messages using the set of selected sidelink resources.

7. The second UE of claim 4,
wherein the one or more processors are further configured to cause the second UE to receive, from the first UE, a set of selected sidelink resources, wherein the one or more processors, to cause the second UE to transmit the retransmission of the plurality of messages, are configured to cause the second UE to transmit the retransmission of the plurality of messages using the set of selected sidelink resources.

8. The second UE of claim 4,
wherein the one or more processors are further configured to cause the second UE to select a set of selected sidelink resources, wherein the one or more processors, to cause the second UE to transmit the retransmission of the plurality of messages, are configured to cause the second UE to transmit the retransmission of the plurality of messages using the set of selected sidelink resources.

9. The second UE of claim 1, wherein at least one priority is associated with the plurality of messages.

10. The second UE of claim 9, wherein the at least one priority comprises a first priority associated with the common message and a second priority associated with the private message.

11. The second UE of claim 9, wherein the at least one priority comprises a joint priority associated with the first common message and the private message.

12. The second UE of claim 9, wherein the one or more processors are further configured to cause the UE to receive configuration information indicating the at least one priority.

13. The second UE of claim 9, wherein the at least one priority is associated with at least one of a mode 1 sidelink resource allocation operation or a mode 2 resource allocation operation.

14. The second UE of claim 9, wherein the one or more processors, to transmit the retransmission of the plurality of messages, are configured to cause the second UE to transmit at least one of the first-common message or the private message based on the at least one priority.

15. The second UE of claim 1, wherein the one or more processors are further configured to cause the second UE to transmit a retransmission mode indication indicating that the at least one retransmission is to be transmitted by the second UE.

16. The second UE of claim 15, wherein the one or more processors, to cause the second UE to transmit the retransmission mode indication, are configured to cause the second UE to transmit the retransmission mode indication via a PC5 interface.

17. The second UE of claim 1, wherein the one or more processors, to cause the second UE to transmit the retransmission of the plurality of messages, are configured to cause the second UE to transmit the at least one retransmission based on a retransmission mode corresponding to the second UE, wherein the retransmission mode is based on at least one of a priority associated with the plurality of messages or a function of a remaining delay associated with the plurality of messages.

18. The second UE of claim 17, wherein the one or more processors are further configured to cause the second UE to transmit a retransmission mode indication indicating the priority.

19. The second UE of claim 1, wherein the one or more processors, to cause the second UE to transmit the at least one retransmission of the plurality of messages, are configured to cause the second UE to transmit the at least one retransmission based on at least one delay parameter.

20. A first user equipment (UE) for wireless communication, comprising:
a memory; and
one or more processors coupled to the memory and configured to cause the first UE to:
receive, from a first network node, a plurality of messages, the plurality of messages comprising a common message and a private message directed to the first UE; and receive, from at least one of the first network node or a second network node and based on a failure, by the first UE, to decode the plurality of messages, at least one retransmission of the plurality of messages, wherein the common message is retransmitted in accordance with a first delay parameter and the private message is retransmitted in accordance with a second delay parameter, the first delay parameter and the second delay parameter based at least in part on a remaining packet delay budget.

21. The first UE of claim 20, wherein the one or more processors, to cause the first UE to receive the at least one retransmission of the plurality of messages, are configured to cause the first UE to:
receive, from the first network node, a first retransmission of the plurality of messages; and
receive, from the second network node, a second retransmission of the plurality of messages.

22. The first UE of claim 21, wherein the second network node comprises at least one of a second UE or a programmable logic controller (PLC).

23. The first UE of claim 22, wherein the one or more processors are further configured to cause the first UE to receive a retransmission mode indication indicating that the at least one retransmission is to be transmitted by the at least one of the first network node or the second network node.

24. The first UE of claim 23, wherein the one or more processors, to cause the first UE to receive the retransmission mode indication, are configured to cause the first UE to receive the retransmission mode indication via at least one of a PC5 interface or an access link.

25. The first UE of claim 20, wherein the one or more processors, to cause the first UE to receive the at least one retransmission of the plurality of messages, are configured to cause the first UE to receive the at least one retransmission based on a retransmission mode corresponding to the at least one of the first network node or the second network node, wherein the retransmission mode is based on at least one of a priority associated with the plurality of messages or a function of a remaining delay associated with the plurality of messages.

26. A method of wireless communication performed by a second user equipment (UE), comprising:
receiving, from a network node, a plurality of messages, the plurality of messages comprising a common message and a first-private message directed to a first UE;
decoding the plurality of messages;
receiving, from the network node, a retransmission indication instructing the second UE to transmit, to the first UE, at least one retransmission of the plurality of messages; and
transmitting, to the first UE, the retransmission of the plurality of messages, wherein the common message is retransmitted in accordance with a first delay parameter and the private message is retransmitted in accordance with a second delay parameter, the first delay parameter and the second delay parameter based at least in part on a remaining packet delay budget.

27. The method of claim 26, wherein transmitting the at least one retransmission of the plurality of messages comprises transmitting the at least one retransmission based on a retransmission mode corresponding to the second UE, wherein the retransmission mode is based on at least one of a priority associated with the plurality of messages or a function of a remaining delay associated with the plurality of messages.

28. A method of wireless communication performed by a first user equipment (UE), comprising:

receiving, from a first network node, a plurality of messages, the plurality of messages comprising a common message and a private message directed to the first UE; and receiving, from at least one of the first network node or a second network node and based on a failure, by the first UE, to decode the plurality of messages, at least one retransmission of the plurality of messages, wherein the common message is retransmitted in accordance with a first delay parameter and the private message is retransmitted in accordance with a second delay parameter, the first delay parameter and the second delay parameter based at least in part on a remaining packet delay budget.

29. The method of claim 28, further comprising receiving a retransmission mode indication indicating that the at least one retransmission is to be transmitted by the at least one of the first network node or the second network node.

30. The method of claim 28, wherein at least one priority is associated with the plurality of messages.

* * * * *